(12) United States Patent
Lewis

(10) Patent No.: US 7,002,131 B1
(45) Date of Patent: Feb. 21, 2006

(54) METHODS, SYSTEMS AND APPARATUS FOR MEASURING AVERAGE RECEIVED OPTICAL POWER

(75) Inventor: David K. Lewis, Agoura Hills, CA (US)

(73) Assignee: JDS Uniphase Corporation, San Jose, CA (US)

(*) Notice: Subject to any disclaimer, the term of this patent is extended or adjusted under 35 U.S.C. 154(b) by 343 days.

(21) Appl. No.: 10/367,501

(22) Filed: Feb. 13, 2003

Related U.S. Application Data

(60) Provisional application No. 60/442,534, filed on Jan. 24, 2003.

(51) Int. Cl.
*H04B 10/06* (2006.01)

(52) U.S. Cl. .................................. 250/214 A; 398/214

(58) Field of Classification Search ............ 250/214 A, 250/227.11, 205; 330/59, 308; 398/118, 398/141, 142, 158, 135–136, 160, 202, 209–210, 398/214
See application file for complete search history.

(56) References Cited

U.S. PATENT DOCUMENTS

| | | | |
|---|---|---|---|
| 3,240,944 A | 3/1966 | Wolfson et al. | |
| 3,463,928 A | 8/1969 | Murphy | |
| 3,626,825 A | 12/1971 | Years | |
| 3,636,763 A | 1/1972 | Ongkienhong | |
| 3,705,986 A | 12/1972 | Sanders et al. | |
| 3,729,633 A | 4/1973 | Eros et al. | |
| 3,731,203 A | 5/1973 | Lieberman | |
| 3,743,837 A | 7/1973 | Pooley et al. | |
| 3,761,185 A | 9/1973 | Blackwell | |
| 3,770,967 A | 11/1973 | Hanna et al. | |
| 3,786,264 A | 1/1974 | Ferro et al. | |
| 3,801,933 A | 4/1974 | Teare | |
| 3,842,262 A | 10/1974 | Heitman et al. | |
| 3,867,628 A | 2/1975 | Brown | |
| 3,872,329 A | 3/1975 | Dodson, III | |
| 3,902,060 A | 8/1975 | Neuner et al. | |
| 3,990,799 A | 11/1976 | Nanba et al. | |
| 4,019,048 A | 4/1977 | Maione et al. | |
| 4,029,976 A | 6/1977 | Fish et al. | |
| 4,070,572 A | 1/1978 | Summerhayes | |
| 4,074,127 A | 2/1978 | Mochida et al. | |
| 4,092,611 A | 5/1978 | Frederiksen et al. | |
| 4,096,382 A | 6/1978 | Numata et al. | |
| 4,149,072 A | 4/1979 | Smith et al. | |
| 4,151,407 A | 4/1979 | McBride et al. | |
| 4,173,723 A | 11/1979 | Temes et al. | |
| 4,218,613 A | 8/1980 | Bletz | |

(Continued)

FOREIGN PATENT DOCUMENTS

WO  WO 02/063800 A1  8/2002

OTHER PUBLICATIONS

Fiber Optic Receiver Applications Note, Philips Semiconductors Data Communications Products, ANN4003, Oct. 12, 1992, pps. 1-12.

(Continued)

*Primary Examiner*—Stephone B. Allen
(74) *Attorney, Agent, or Firm*—Allen, Dyer, Doppelt, Milbrath & Gilchrist, P.A.

(57) ABSTRACT

Methods, systems and apparatus for measuring average received optical power by an optical receiver. A TO-package for a packaged optical receiver is disclosed having a pin-out configuration for facilitating the direct measurement of the level of photo current induced into an optical receiver. A method and system are disclosed which include the packaged optical receiver for measuring the average received optical power by an optical receiver.

40 Claims, 17 Drawing Sheets

U.S. PATENT DOCUMENTS

| | | |
|---|---|---|
| 4,236,069 A | 11/1980 | Laughlin |
| 4,236,256 A | 11/1980 | Brackett et al. |
| 4,241,455 A | 12/1980 | Eibner |
| 4,249,264 A | 2/1981 | Crochet et al. |
| 4,249,266 A | 2/1981 | Nakamori |
| 4,257,125 A | 3/1981 | Theall, Jr. |
| 4,262,366 A | 4/1981 | Eumurian |
| 4,276,472 A | 6/1981 | Costantino et al. |
| 4,281,253 A | 7/1981 | Culver |
| 4,301,543 A | 11/1981 | Palmer |
| 4,303,855 A | 12/1981 | Bapst et al. |
| 4,310,755 A | 1/1982 | Miller |
| 4,317,232 A | 2/1982 | Pickett et al. |
| 4,330,870 A | 5/1982 | Arends |
| 4,363,977 A | 12/1982 | Tsuda et al. |
| 4,366,378 A | 12/1982 | Simons |
| 4,388,732 A | 6/1983 | Hansel |
| 4,399,564 A | 8/1983 | Cowen |
| 4,399,565 A | 8/1983 | Jarret et al. |
| 4,415,803 A | 11/1983 | Muoi |
| 4,420,724 A | 12/1983 | Owen |
| 4,429,218 A | 1/1984 | Thomas |
| 4,435,850 A | 3/1984 | Bowen et al. |
| 4,451,916 A | 5/1984 | Casper et al. |
| 4,473,745 A | 9/1984 | Chown |
| 4,481,676 A | 11/1984 | Eumurian et al. |
| 4,481,678 A | 11/1984 | Sakamoto et al. |
| 4,498,001 A | 2/1985 | Smoot |
| 4,498,197 A | 2/1985 | Chown |
| 4,502,937 A | 3/1985 | Yagi |
| 4,535,233 A | 8/1985 | Abraham |
| 4,545,076 A | 10/1985 | Biard et al. |
| 4,556,875 A | 12/1985 | Ishiwatari |
| 4,563,656 A | 1/1986 | Baum |
| 4,564,818 A | 1/1986 | Jones |
| 4,565,974 A | 1/1986 | Smoot |
| 4,567,446 A | 1/1986 | Konishi |
| 4,574,249 A | 3/1986 | Williams |
| 4,609,880 A | 9/1986 | Dermitzakis et al. |
| 4,620,321 A | 10/1986 | Chown |
| 4,633,523 A | 12/1986 | Witkover |
| 4,641,378 A | 2/1987 | McConnell et al. |
| 4,642,453 A | 2/1987 | Nordqvist et al. |
| 4,647,762 A | 3/1987 | Chown |
| 4,709,979 A | 12/1987 | Spodati et al. |
| 4,713,841 A | 12/1987 | Porter et al. |
| 4,714,828 A | 12/1987 | Bacou et al. |
| 4,724,312 A | 2/1988 | Snaper |
| 4,724,315 A | 2/1988 | Goerne |
| 4,731,529 A | 3/1988 | Ohsawa |
| 4,750,217 A | 6/1988 | Smith et al. |
| 4,758,767 A | 7/1988 | Blake |
| 4,761,549 A | 8/1988 | Mealer, III et al. |
| 4,764,732 A | 8/1988 | Dion |
| 4,786,797 A | 11/1988 | Ely |
| 4,792,997 A | 12/1988 | Toussaint et al. |
| 4,792,998 A | 12/1988 | Toussaint |
| 4,797,556 A | 1/1989 | Marzari et al. |
| 4,805,236 A | 2/1989 | Urala |
| 4,817,208 A | 3/1989 | Koch et al. |
| 4,893,002 A | 1/1990 | Kollanyi |
| 4,903,338 A | 2/1990 | Funke |
| 4,904,860 A | 2/1990 | Okagaki |
| 4,945,225 A | 7/1990 | Gamgee et al. |
| 4,945,229 A | 7/1990 | Daly et al. |
| 4,975,566 A | 12/1990 | Uda |
| 4,994,675 A | 2/1991 | Levin et al. |
| 4,998,012 A | 3/1991 | Kruse |
| 5,007,038 A | 4/1991 | Nakane et al. |
| 5,008,524 A | 4/1991 | Reutter et al. |
| 5,012,202 A | 4/1991 | Taylor |
| 5,013,903 A | 5/1991 | Kasper |
| 5,019,769 A | 5/1991 | Levinson |
| 5,025,456 A | 6/1991 | Ota et al. |
| 5,030,925 A | 7/1991 | Taylor |
| 5,036,187 A | 7/1991 | Yoshida et al. |
| 5,069,522 A | 12/1991 | Block et al. |
| 5,095,286 A | 3/1992 | Cole et al. |
| 5,126,815 A | 6/1992 | Murakami et al. |
| 5,142,142 A | 8/1992 | Senechalle et al. |
| 5,155,614 A | 10/1992 | Carmen et al. |
| 5,166,819 A | 11/1992 | Eichel |
| 5,179,461 A | 1/1993 | Blauvelt et al. |
| 5,202,553 A | 4/1993 | Geller |
| 5,220,581 A | 6/1993 | Ferraiolo et al. |
| 5,224,128 A | 6/1993 | Grallert |
| 5,251,054 A | 10/1993 | Lynn |
| 5,253,096 A | 10/1993 | Freeman et al. |
| 5,260,563 A | 11/1993 | Hunter et al. |
| 5,295,161 A | 3/1994 | Dreps et al. |
| 5,302,911 A | 4/1994 | Miyashita |
| 5,307,196 A | 4/1994 | Kinoshita |
| 5,313,323 A | 5/1994 | Patel |
| 5,329,115 A | 7/1994 | Lim |
| 5,332,919 A | 7/1994 | Fujimura |
| 5,335,109 A | 8/1994 | Heidemann |
| 5,355,242 A | 10/1994 | Eastmond et al. |
| 5,371,763 A | 12/1994 | Ota et al. |
| 5,430,765 A | 7/1995 | Nagahori |
| 5,442,321 A | 8/1995 | Bayruns et al. |
| 5,442,472 A | 8/1995 | Skrobko |
| 5,455,703 A | 10/1995 | Duncan et al. |
| 5,467,219 A | 11/1995 | Ushirozawa |
| 5,469,287 A | 11/1995 | Iwakuni |
| 5,473,461 A | 12/1995 | Miremadi |
| 5,475,381 A | 12/1995 | Williamson et al. |
| 5,479,288 A | 12/1995 | Ishizuka et al. |
| 5,481,104 A | 1/1996 | Miller et al. |
| 5,495,358 A | 2/1996 | Bartig et al. |
| 5,499,244 A | 3/1996 | Mosch et al. |
| 5,513,029 A * | 4/1996 | Roberts ........................ 398/32 |
| 5,517,035 A | 5/1996 | Krijntjes |
| 5,517,351 A | 5/1996 | Hatakeyama |
| 5,528,408 A | 6/1996 | McGinley et al. |
| 5,541,759 A | 7/1996 | Neff et al. |
| 5,557,265 A | 9/1996 | Moothart et al. |
| 5,576,877 A | 11/1996 | Aulet et al. |
| 5,589,683 A | 12/1996 | Nakai |
| 5,591,962 A | 1/1997 | Koishi et al. |
| 5,600,471 A | 2/1997 | Hirohashi et al. |
| 5,602,670 A | 2/1997 | Keegan |
| 5,606,282 A | 2/1997 | Yoshida |
| 5,610,395 A | 3/1997 | Nishiyama |
| 5,612,810 A | 3/1997 | Inami et al. |
| 5,701,195 A | 12/1997 | Chikama |
| 5,710,660 A | 1/1998 | Yamamoto et al. |
| 5,734,300 A | 3/1998 | Yoder |
| 5,760,939 A | 6/1998 | Nagarajan et al. |
| 5,761,225 A | 6/1998 | Fidric et al. |
| 5,767,997 A | 6/1998 | Bishop et al. |
| 5,777,507 A | 7/1998 | Kaminishi et al. |
| 5,790,295 A | 8/1998 | Devon |
| 5,801,588 A | 9/1998 | Nishiyama |
| 5,812,717 A | 9/1998 | Gilliland |
| 5,822,104 A | 10/1998 | Saito |
| 5,828,476 A | 10/1998 | Bonebright et al. |
| 5,854,683 A | 12/1998 | Keane |
| 5,864,416 A | 1/1999 | Williams |
| 5,875,049 A | 2/1999 | Asano et al. |
| 5,883,476 A | 3/1999 | Noguchi et al. |
| 5,896,480 A | 4/1999 | Scharf et al. |
| 5,952,887 A | 9/1999 | Katayanagi et al. |
| 5,969,841 A | 10/1999 | McGinley et al. |
| 6,018,284 A | 1/2000 | Rival et al. |

| | | | |
|---|---|---|---|
| 6,037,841 A | 3/2000 | Tanji et al. | |
| 6,307,659 B1 | 10/2001 | Gilliland et al. | |
| 6,377,082 B1 | 4/2002 | Loinaz et al. | |
| 6,522,461 B1 | 2/2003 | Cornelius et al. | |
| 6,540,412 B1 | 4/2003 | Yonemura et al. | |
| 6,583,910 B1 * | 6/2003 | Satoh | 398/182 |
| 2004/0253003 A1 * | 12/2004 | Farmer et al. | 398/214 |

OTHER PUBLICATIONS 1.25 Gbps Limiting Amplifier, MC2046-2/C, Postamplifiers/Quantiser for Gigabit Ethernet and Fiber Channel Applications, Mindspeed, Oct. 22, 1999, pps. 1-8.

3.0V to 5.5V, 1.25Gbps/2.5Gbps Limiting Amplifiers, Maxim Integrated Products, 19-1523; Rev. 4, Jul. 2001, pps. 1-14.

HFTA-04.0: Optical/Electrical Conversion in SDH/SONET Fiber Optic systems, Maxim Integrated Products, APP 649, Jun. 28, 2000, pps. 1-5.

Chorng-Kuang Wang, "A BiCMOS Limiting Amplifier for SONET OC-3," IEEE Journal of Solid-State Circuits, vol. 31, No. 8, Aug. 1996, pps. 1197-1200.

Charles K. Kao, "Optical Fiber Systems: Technology, Design, and Applications," Electro-Optical Products Division ITTT, McGraw-Hill Book Company, 1982, pps. 178-180.

Low-Power, 622Mbps Limiting Amplifiers with Chatter-Free Power Detect for LANs, Maxim Integrated Systems, 19-1097; Rev 1; Sep. 1996, pps. 1-12.

MAX3761 Evaluation Kit, Maxim Integrated Products, 19-1112; Rev 0; Aug. 1996, pps. 1-6.

1 Gbps, High-Speed Limiting Amplifier with Chatter-Free Loss-of-Signal Detection, Maxim Integrated Products, 19-0324; Rev. 1; Jan. 1995, pps. 1-8.

Using MAX3265 LOS in GBICs, Maxim High-Frequency/Fiber Communications Group, Design Note: HFDN-11.0, rev. 0; Dec. 2000, pps. 1-4.

A Brief Introduction to Jitter in Optical Receivers, Maxim Integrated Products, MAXIM High-Frequency/Fiber Communications Group, Application Note: HFAN-4.0.1, Rev 0; Dec. 2000, pps. 1-5.

Setting a LOP (Loss of Power) Threshold Level Equivalent to a BER Level of 10-3, Maxim Integrated Products, MAXIM High-Frequency/Fiber Communications Group, Application Note: HFAN-3.0.1, Rev 0; Dec. 2000, pps. 1-4.

Jeff Hecht, Understanding Fiber Optics, pp. 127-148, Howard W. Sams & Company, Indianapolis, Indiana 1987.

Marin H. Weik, Fiber Optics Standard Dictionary, Second Edition, pp. 93, 208, 256-258, 292, 230-232 and 326, Van Nostrand Reinhold, New York, NY 1989.

Joseph T. Verdeyen, Laser Electronics, Third Edition, pp. 697-728, Prentice Hall, Englewood Cliffs, NJ, 1995.

Richard C. Dorf, The Electrical Engineering Handbook, pp. 1430-1434, CRC Press, Boca Raton, FL 1993.

Amnon Yariv, Introduction to Optical Electronics, Second Edition, pp. 298-336, Holt, Rinehart and Winston, New York, NY 1976.

Texas Instruments, High-Side Measurement Current Shunt Monitor, INA138 INA 168, SBOS 122A, Dec. 1999, Revised Dec. 2002.

Maxim Integrated Products, 1.25Gbos/2.5Gbps, +3V to +5.5V, Low-Noise Transimpedance Preamplifiers for LANs, 2000.

Dallas Semiconductor, Optical Transceiver Diagnostic Monitor DS1852, pp. 1-25, www.maximum-ic.com.

Dallas Semiconductor, Application Note 214 How to Interpret DS1852 Temperature and Voltage Readings, pp. 1-3, www.maxim-ic.com.

Dan Kane, Diagnostic Monitoring Interface for Optical Xcvrs, pgs 1-29, SFF Committe, Saratoga, CA Aug. 1, 2002.

* cited by examiner

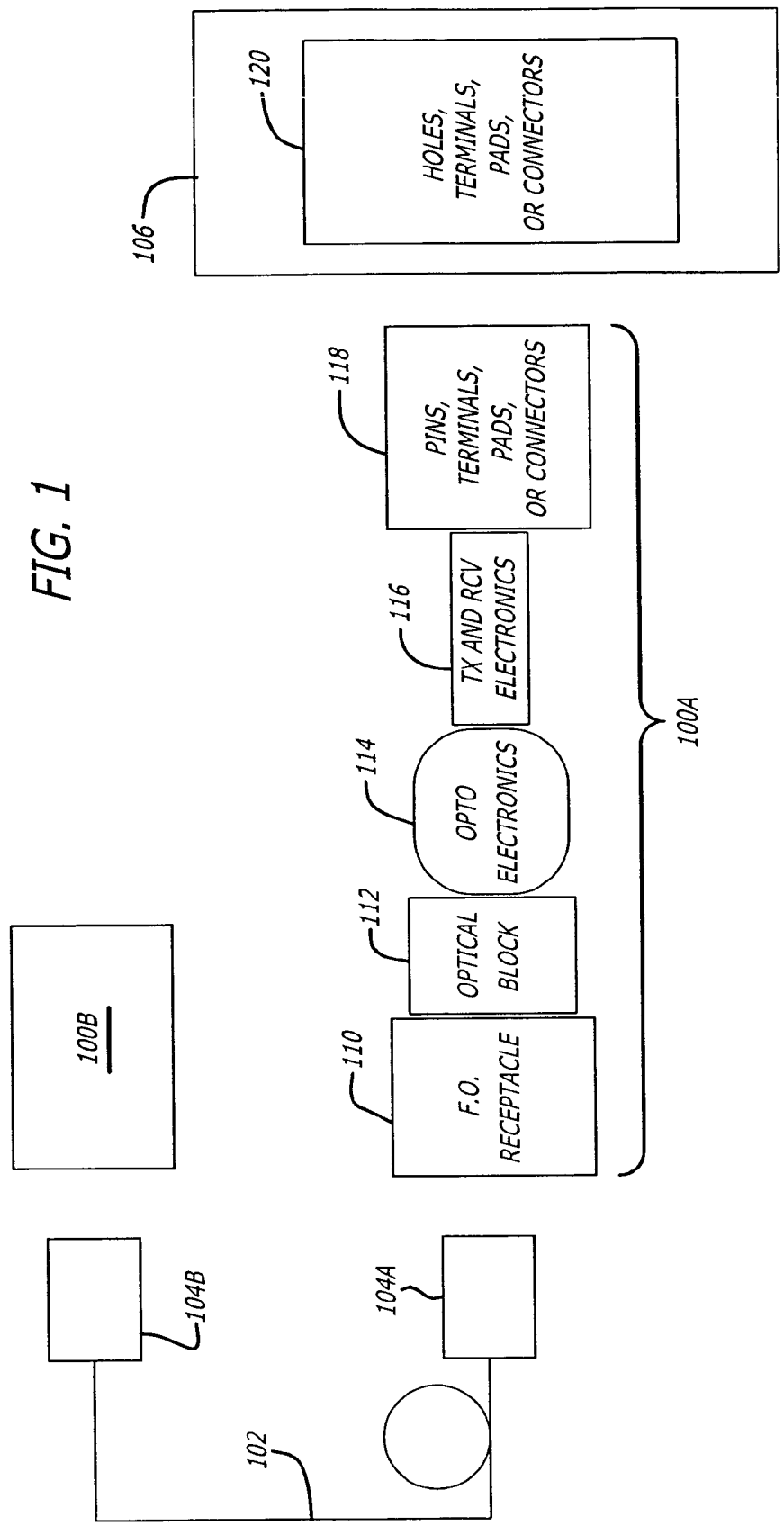

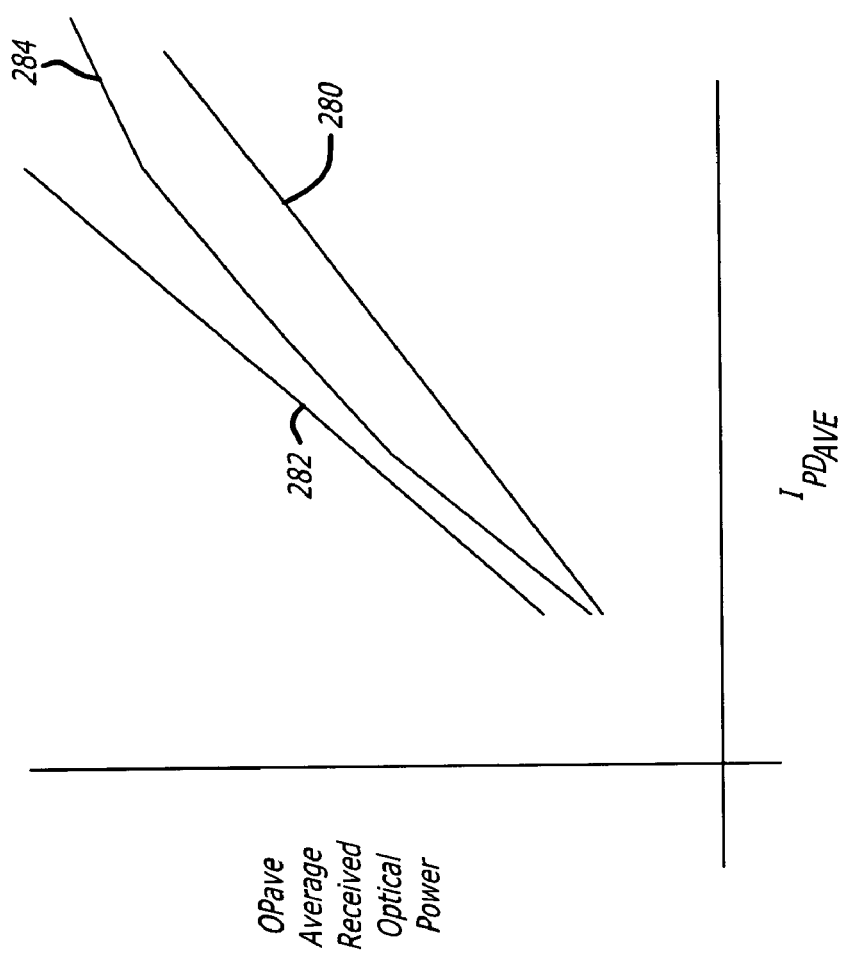

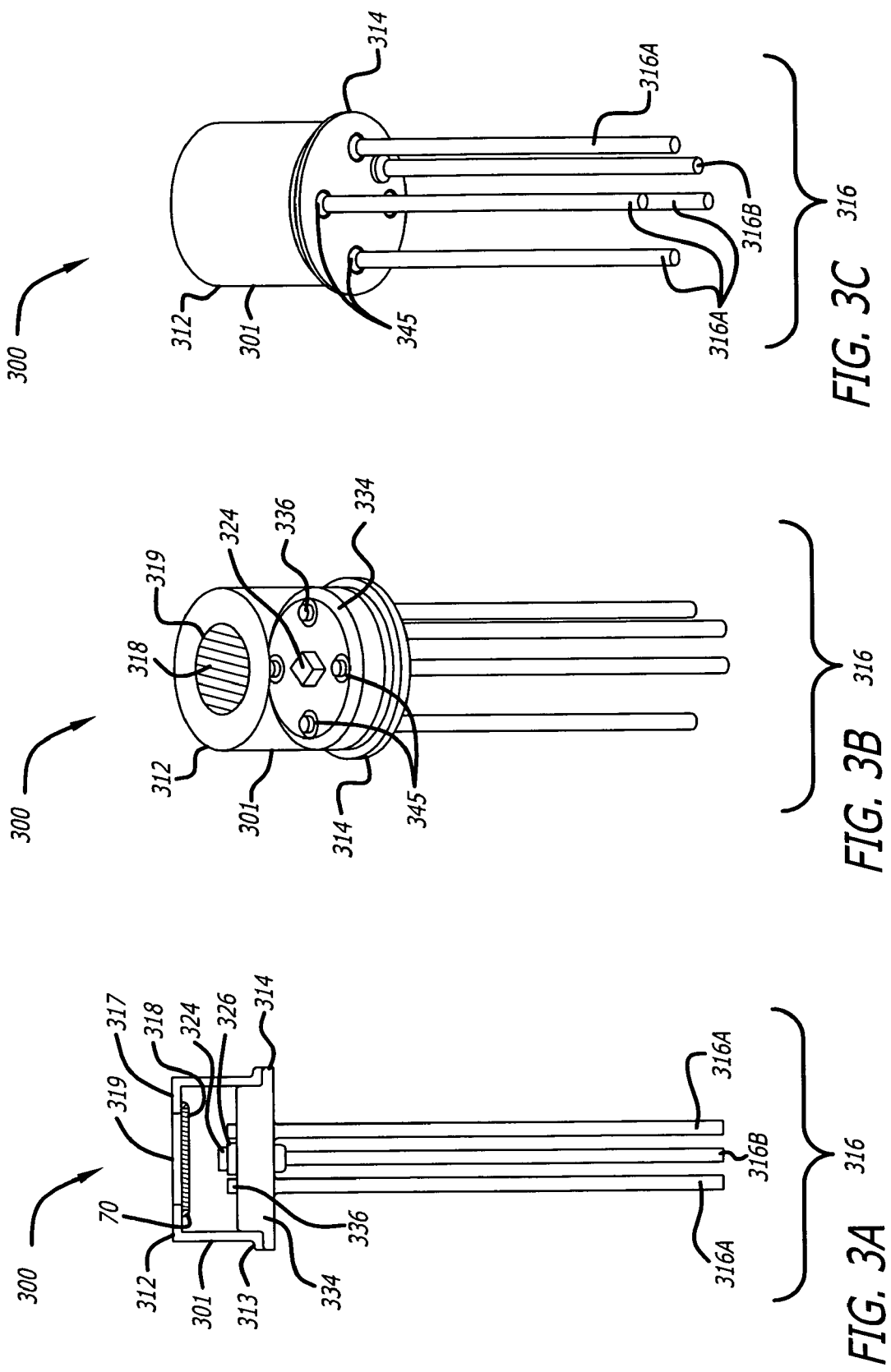

METHODS, SYSTEMS AND APPARATUS FOR MEASURING AVERAGE RECEIVED OPTICAL POWER

CROSS REFERENCED TO RELATED APPLICATION

This U.S. Non-Provisional Patent Application claims the benefit of U.S. Provisional Patent Application No. 60/442,534 entitled "METHODS, SYSTEMS AND APPARATUS FOR MEASURING AVERAGE RECEIVED OPTICAL POWER", filed Jan. 24, 2003 by David Lewis.

FIELD OF THE INVENTION

The invention relates generally to the field of optoelectronic receivers. Particularly, the invention relates to photo detector packaging, detecting optical power in received light signals, and determining a measure of the average received optical power within the received light signals.

BACKGROUND OF THE INVENTION

Optoelectronic receivers to receive light, such as a photodetector, are well known. The photodetector is commonly used as a means to detect a data stream within a modulated light signal on a receiving side of a light or optical communication channel. On a transmitting side of the light or optical communication channel, the optical power in a laser beam output of a laser within a transmitter is often monitored for the purpose of automatic power monitoring (APC) and maintaining an average level of optical power output from the transmitter. It can also be useful to detect optical power at the receiving side to determine a measure of the average received optical power, as will be explained further below.

BRIEF DESCRIPTION OF THE DRAWINGS

The features of the invention will become apparent from the following detailed description of the invention in which:

FIG. 1 is a block diagram of a typical optical data link.

FIG. 2F is a chart diagram illustrating various methods of scaling that can be used to calibrate the average current measuring circuit to provide a scaled measure of the average receive optical power.

FIG. 3A is a magnified cross sectional view of an embodiment of a packaged optical receiver including the pin out for measuring the average receive optical power.

FIG. 3B is a magnified top cutaway perspective view of FIG. 3A.

FIG. 3C is a magnified bottom perspective view of FIG. 3A.

DETAILED DESCRIPTION OF THE INVENTION

Figure 2A:
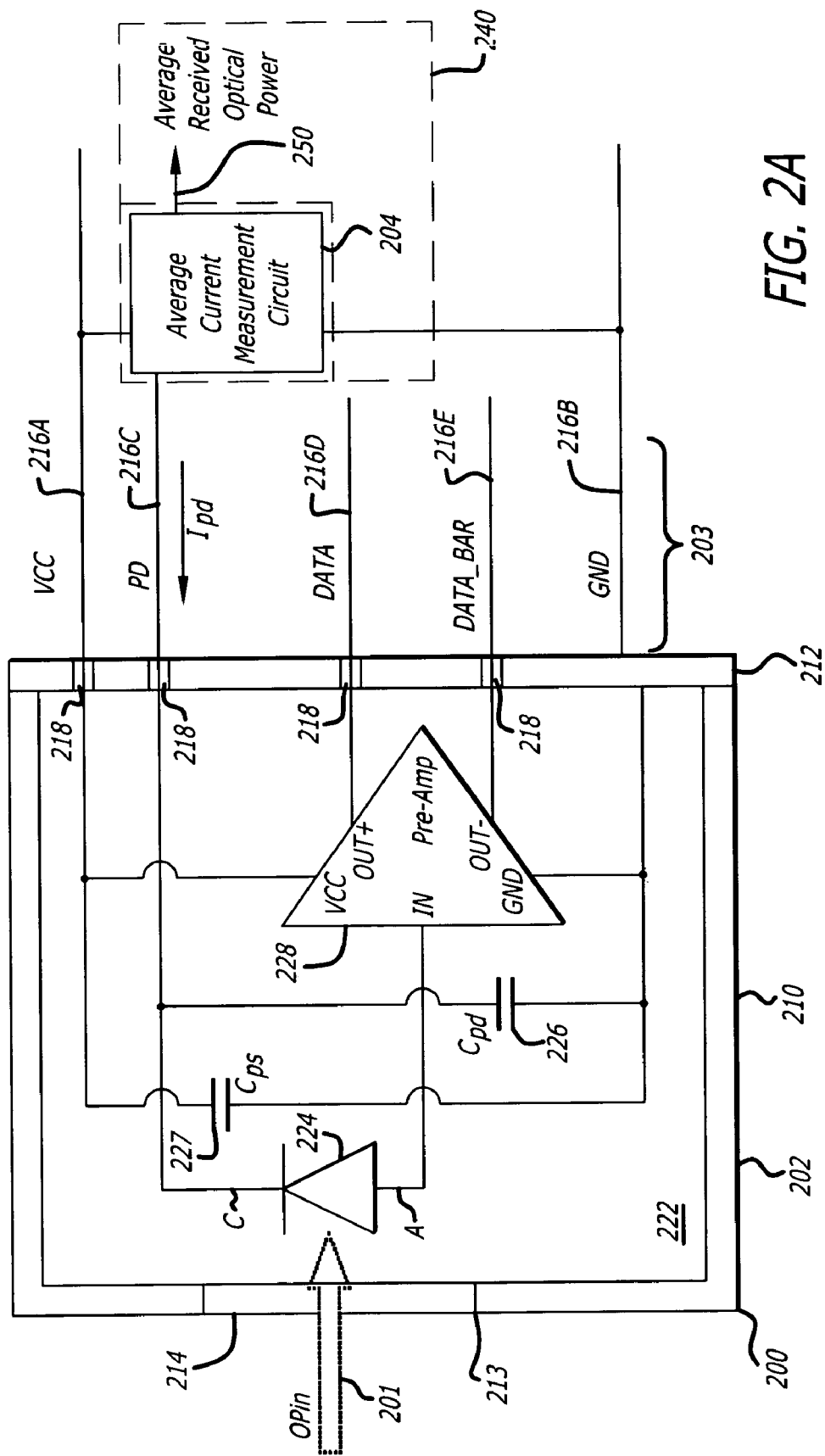
FIG. 2A is a schematic diagram illustrating an embodiment of the methods, systems, and apparatus for measuring the average receive optical power.

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

Users of optical receivers desire a measurement of the received average optical power level during normal receiver operation. Average optical power is optical power averaged over a time period and has the units of watts or dBm, if expressed as a power ratio. Generally, optical power is the amount of light energy Q flowing past a point at a particular time (dQ/dt) and has units of watts. A measurement of the received average optical power level is useful because it can alert a user to conditions where the average received optical power is very low, near-to, or below the sensitivity level of the optical receiver. The measurement of the received average optical power level is also useful because it can alert the user to conditions where the average received optical power is very high, near-to, or above the saturation level of the optical receiver. Both ends of the power range, the high end and the low end, are important because average optical power levels below the sensitivity level or above the saturation level can lead to incorrect data performance or errors. Ideally the measurement of received average optical power level will be accurate over at least the full dynamic range (between the sensitivity and saturation levels) of the optical receiver.

Prior methods of estimating the received average optical power level sensed the levels of electrical signals after the photocurrent had been amplified and converted to digital logic signals. These prior methods were inaccurate, particularly at the low end and high ends of the average optical power dynamic range. This is because the amplifiers which were used to convert the photocurrent into digital logic signals have a high gain, in order to receive very low power levels, and a limiting function, so that high power levels can be received without the digital logic signal levels becoming larger than the power supply voltages or larger than levels that produce unwanted electromagnetic emissions.

This invention provides a means to directly measure the average photocurrent induced in the optical photodetector by the received optical power. Photodetectors can measure the total optical power incident on their light detecting (active) area. Given a uniform light intensity and detector response, the total optical power received by a photodetector can be estimated by the product of its active area times the power per unit area in the incident light. In other cases, the total optical power received from a light source is the irradiance E, the power density per unit area, integrated over the area A over which its collected. Sometimes irradiance is referred to as light intensity.

Optical photodetectors, when biased appropriately, produce a photocurrent that is proportional to the received optical power level over the full dynamic range of an optical receiver. By directly measuring the average photocurrent induced in the optical photodetector the received optical power can be monitored to provide an indication of the operation of a communication channel, including the optical transmitter at an opposite end, the transmission media (such as an optical fiber and its plugs), and the optical receiver itself. Lower power levels can indicate a problem in any one or more of these elements in a communication channel. A user can then diagnose a problem early before a bit error rate becomes unacceptable and replace a faulty element in the channel or reroute the channel around the failing element. Too high of a power level can be a problem as well with an optical transmitter. Excessively high optical power levels can overload an optical receiver causing it to saturate and introduce distortion in analog signal levels due to a non-linear response and thereby induce an increase in the bit error rate (BER) in the digital data signal.

In an embodiment of the invention, an optical receiver is packaged to provide a pin out for directly measuring the average photocurrent induced in an optical photodetector. In another embodiment of the invention, a method, apparatus, and system is provided for measuring the average received optical power level. In another embodiment of the invention, a fiber optic module is provided including the method, apparatus, and system for measuring the average received optical power level.

In a preferred embodiment, the optical receiver is packaged in a thin outline (TO) based package, such as a TO-46, with the pin out for directly measuring the average photocurrent induced in the optical photodetector mounted therein. The packaged optical receiver may be incorporated into an optical transceiver or fiber optic module of an optical data link or an optical communication system.

Referring now to FIG. 1, a typical optical data link is illustrated. An optical data link includes an optical transceiver 100A, an optical transceiver 100B, and at least one fiber optic cable 102. Each of the optical transceivers 100A and 100B are bi-directional optical transceivers to interface to the at least one optical fiber 102. The elements of each optical transceivers 100A and 100B may be substantially similar. The at least one optical fiber 102 includes a first plug 104A and a second plug 104B.

The typical block functional elements of the optical transceiver 100A includes a nose or fiber optic receptacle 110, an optical block 112, optical electronics 114, transmit and/or receive electronics 116, and pins, terminals, pads, or connectors 118.

The nose or fiber optic receptacle 110 receives the fiber optic plug 104A of the at least one optical fiber 102. The nose mechanically couples to the optical fiber 102. The nose may have an opening to receive various types of fiber optic plugs including simplex and duplex type plugs. The fiber optical receptacle 110 holds the plug 104A in alignment with the optical block.

The optical transceiver 100A may couple to a host system 106. In order to do so the host system 106 may include poles, terminals, pads, or connectors 120 to couple to the pins, terminals, pads, or connectors 118 respectfully of the optical transceivers 10A. The pins, terminals, pads, or connectors 118 of the optical transceiver 100A is for coupling to the host system 106.

The optical block 112 is for coupling light between the optical electronics 114 and the optical fiber 102. The optical block 112 may include one or more lenses or light bending elements to couple light between the optical fiber 102 and the packaged optoelectronic components 114.

The packaged optoelectronic components 114 may transduce between electrical signals and optical signals. The packaged optoelectronic components 114 may include a packaged semiconductor laser (i.e., packaged optical transmitter), a packaged semiconductor detector (i.e., packaged optical receiver), or both. In packaging the optoelectronic components, a thin outline (TO) based package may be used.

The transmit and receive electronics 116 appropriately controls the packaged optoelectronic components 114 to generate lights signals or receive light signals as well as electrical signals at the pins, terminals, pads, or connectors 118. The transmit and receive electronics 116 further includes an average current measurement circuit to couple to the pinout of a packaged optical receiver of the packaged optoelectronic components 114 to measure the average received optical power.

Referring now to FIG. 2A, a schematic diagram illustrates an embodiment of the methods, systems, and apparatus for measuring the average receive optical power. A packaged optical receiver 200 receives light signals 201 having an optical power input (OPin). The light signals or signal 201 include(s) data signal(s) which have been modulated into the light signal(s) 201 so that they may also be referred to herein as modulated light signals or a modulated light signal. The packaged optical receiver 200 has a device package 202 with a pin out 203 to couple to the receive electronics 116. The receive electronics 116 includes an average current measurement circuit 204.

The device package 202 may include a cover 210 coupled to a base or header 212. The cover 210 includes an opening 213 and a window 214 adjacent the opening 213 to allow the light signals to pass through into the device package 202. The window 214 is transparent to the wavelengths of light signals 201 which are desired to be received. In a preferred embodiment, the device package 202 is a thin outline (TO) can type of package.

The pinout 203 may be one or more pins including a power pin VCC 216A, a ground pin GND 216B, a photodetector pin PD 216C, a positive data pin DATA 216D, and a negative data pin DATA_BAR 216E. The power pin VCC 216A, the photodetector pin PD 216C, the positive data pin DATA 216D, and the negative data pin DATA_BAR 216E may extend through the header 212 and into the device package 202 by using feedthroughs 218. The ground pin GND 216B typically couples to the header 212 to provide a common mounting and grounding surface. Otherwise, the ground pin GND 216B may be provided with a feedthrough 218 as well even though its not illustrated in FIG. 2A.

The optical receiver 200 illustrated in FIG. 2A has five pins (PD 216C, VCC 216A, DATA 216D, DATA_BAR 216E, GND 216B) to make five connections. If the amplifier pre-amp 228 is single ended with a single output (DATA 216D or DATA_BAR 216E) or if the anode A of the photodetector 224 is extended outside the package eliminating the pre-amp 228, the number of pins may be reduced to four to make four connections in an alternate embodiment.

The additional connection (PD) between the photodetector/pre-amplifier package and the rest of the optical receiver 200 separates the photocurrent (IPD) from the amplifier supply current so that IPD can be measured using an average current measuring circuit 204. The average current measuring circuit 204 includes a number of discrete analog circuits for processing analog voltage or current signals. These analog signals may be scaled and offset to scale the average received optical power level by including an analog offset signal and/or a variable gain circuit. Scaling allows a functional relationship to have a change in starting points by a change in the offset and a change in slope from a change in the variable gain. The variable gain may be provided by a variable resistor in the form of a digital or analog potentiometer. Otherwise, the average current measuring circuit 204 may include one or more discrete digital circuits such as a multiplying A/D converter that may be used to digitally scale the average received optical power including adding a digital offset and digitally altering the slope. Scaling may also be referred to as an adjustment or a transformation in the slope, offset of a line or a curve. FIG. 2F, further described below, illustrates various scaling methods that may be used to obtain a more accurate measure of average received optical power.

For sophisticated monitoring, the average current measuring circuit 204 may be integrated with a monitoring circuit 240 or otherwise may couple thereto. The monitoring circuit 240 may provide digital scaling of the average received optical power including a digital offset, digital slope, and a digital curve fitting function by a polynomial function to more accurately scale and represent an average received optical power level over the entire dynamic range of a photodetector. Furthermore, the monitoring circuit 240 can keep a running history of the level of the average received optical power. It can also make comparisons between the average received optical power and user set flag levels. If the flag levels are exceeded by the measured average received optical power level, a warning can be sent to the user to indicate a failing communication channel for example. The monitoring circuit 240 may be a digital circuit such as a microprocessor, microcomputer, or microcontroller with registers and a memory that can store data values and a monitoring program. The monitoring circuit may execute the monitoring program to monitor the average received optical power level in the optical communication channel and provides a warning to the user if limits are exceeded to indicate a failing communication channel for example. The monitoring circuit may also monitor the detected data received from the optical communication channel to further determine the operation status of the optical communication channel. For example, the average number of transitions in the detected data may be monitored to determine an approximate bit error rate.

Monitoring the average received optical power with the embodiments of the invention can conserve power by avoiding the use of redundant optical communication links or channels and by the advanced replacement of failing components. Advanced replacement may reduce power consumption by keeping the communication channel active, avoiding data loss and the repetitive retransmission tries to transmit data, and avoid extra power that may be wasted be a failing component.

In one embodiment the monitoring circuit 240 is an optical transceiver diagnostic monitor, part number DS1852, manufactured by Maxim Integrated Products (formerly Dallas Semiconductor). In another embodiment, the monitoring circuit 240 may be the integrated memory controller circuit for fiber optics transceiver described in U.S. patent application Ser. No. 09/777,917, filed Feb. 5, 2001, by Lewis Aronson and Stephen Hosking and published on Aug. 15, 2002 by International Publication No. WO 02/063800A1. In another embodiment, the monitoring circuit 240 may be formed to be in compliance with a Small Form Factor (SFF) Committee specification, SFF-8472, for Diagnostic Monitoring Interface for Optical Xcvrs, Rev. 9.3, Aug. 1, 2002.

Figure 2B:
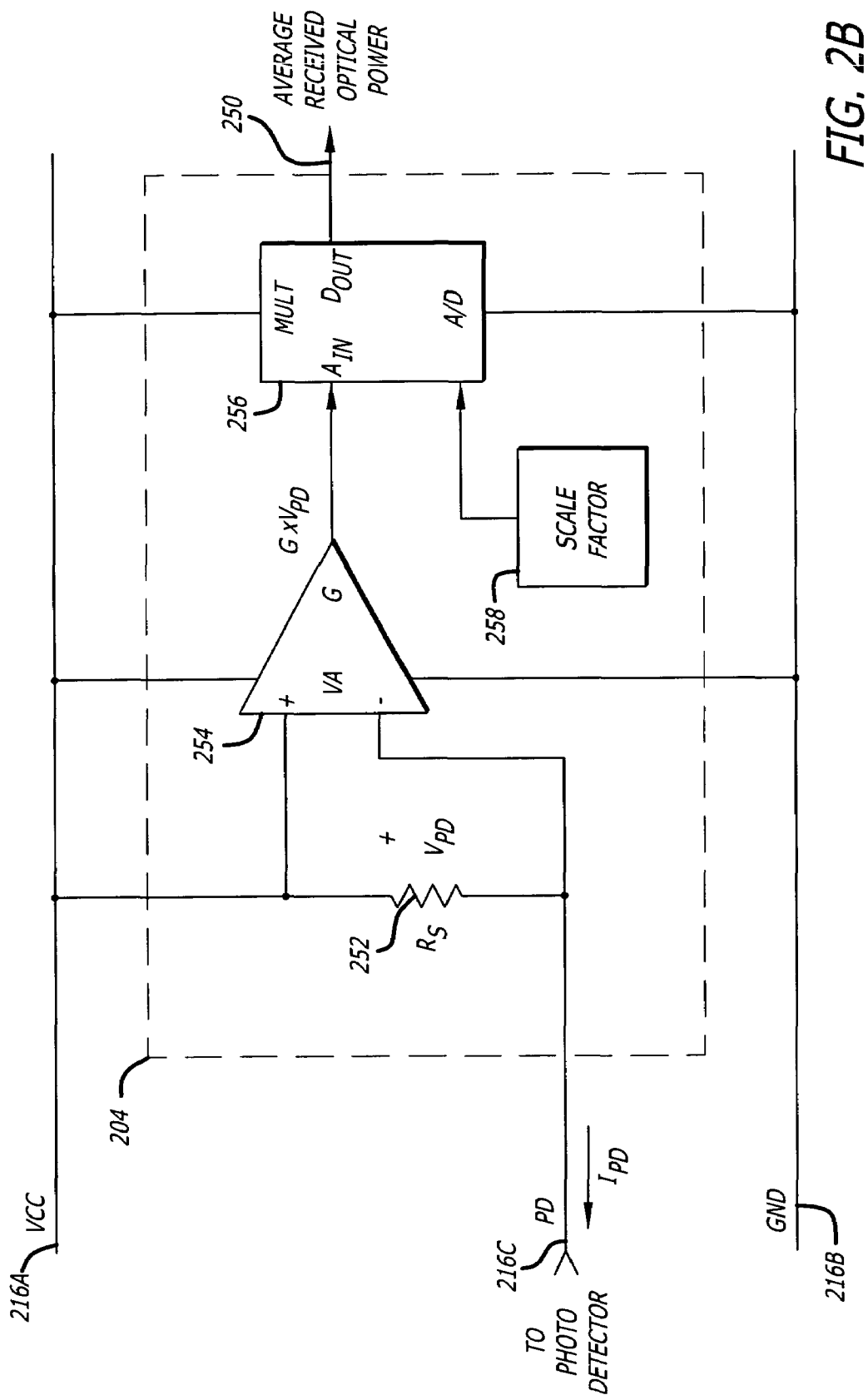
FIG. 2B is a schematic diagram illustrating an exemplary embodiment of an average current measuring circuit for FIG. 2A.

Referring now to FIG. 2B, a schematic diagram of an exemplary embodiment of an average current measuring circuit 204 is illustrated. As discussed previously, the average current measuring circuit 204 may be integrated with a monitoring circuit 240 or otherwise may or may not couple thereto. The exemplary embodiment of the average current measuring circuit 204 coupled together as shown in FIG. 2B includes a sense resistor Rs 252, and an operational amplifier OA 254 to obtain an analog level proportional to a measure of the average received optical power in the light signal 201. To obtain a digital value, the average current measuring circuit includes an analog to digital converter 256 that converts the analog level of the measure of the average received optical power into a digital value or number. If the value or number is to be scaled, a scale factor 258 is provided within a register or memory to the analog to digital converter 256 which is multiplied thereto to scale or adjust the output value or number of the analog to digital converter 256. In this case, the analog to digital converter 256 is a multiplying analog to digital converter. The analog to digital converter 256 may be an analog to digital converter of the monitoring circuit 240 and the scale factor 258 may be stored in a register or memory of the monitoring circuit 240. The operational amplifier 254 may also be a part of the monitoring circuit 240 in one embodiment. In another embodiment, the operational amplifier 254 and the analog to digital converter 256 are discrete components coupled to a microprocessor, microcomputer, or a microcontroller with the scale factor 258 stored in a register therein each of which may function as the monitoring circuit and generate the average received optical power value 250. In one embodiment, the operational amplifier 254 is a high-side measurement current shunt monitor, part no. INA138/168 manufactured by Texas Instruments (Formerly Burr-Brown).

The sense resistor Rs 252 couples at a first end to the positive input and a second end to the negative input of the operational amplifier OA 254. The first end of the sense resistor Rs 252 further couples to the power pin VCC 216A. The second end of the sense resistor Rs 252 further couples to the cathode terminal of the photodetector 224 by coupling to the photodetector pin PD 216C. The output of the operational amplifier OA 254 is coupled to the analog input of the analog to digital converter (A/D) 256. The operational amplifier OA 254 may have gain g which is multiplied with the input voltage level to amplify the analog level of the average received optical power. The gain g may be made variable by use of a digital potentiometer to otherwise scale the analog level of the average received optical power instead of scaling a digital number as previously discussed.

In operation, the photocurrent Ipd flow through the sense resistor Rs 252 generating a voltage Vpd across the input terminals of the operational amplifier 254. The operational amplifier 254 amplifies the voltage Vpd by the gain g generating an output level of g×Vpd which is coupled into the analog to digital converter 256. The analog to digital converter 256 converts the analog value into a digital value. The digital value may be output directly as the average received optical power, or in the case of a multiplying A/D, the digital value may be scaled by the scale factor 258 to generate a scaled version of the average received optical power 250.

Referring back to FIG. 2A, the optical receiver 200 has mounted in an interior 222 of the device package 202, a photodetector 224, a capacitor Cpd 226, and an amplifier Pre-Amp 228 which may be coupled together as shown and illustrated in FIG. 2A. The optical receiver 200 may additionally have a capacitor Cps 227 mounted in the interior 222 and coupled between the power VCC 2126A and the ground GND 216B to maintain a steady power supply level and filter out noise.

The photodetector 224 may be a semiconductor photodiode, a semiconductor photodetector, or a semiconductor photovoltaic, such as a solar cell. The photodetector 224 may also be referred to generally as a light sensor or a light detector. The photodetector 224 may also be one of a number of conventional discrete semiconductor detectors such as a p-i-n photodiode, a p-n junction photodiode, avalanche photodiode, or photodarlington purchased off the shelf. Alternatively, the photodetector 224 may be a custom photodetector and/or integrated on the same silicon die with the amplifier pre-amp 228 and/or the capacitor C 226 such as in the case of a phototransistor, a pin-FET, or other integrated detector-amplifiers which are readily available. The photodetector 224 may be formed out of silicon, gallium arsenide, germanium, indium phosphide, indium gallium arsenide, indium gallium arsenide phosphide, or other semiconductor materials depending upon the responsivity and quantum efficiency for the desired wavelengths to be received. In a preferred embodiment, the range of desired wavelengths to be received varies from 400 nanometers to 1600 nanometers. In embodiments of the photodetector 224, different semiconductor materials may be more sensitive to subranges of wavelengths of light over the range of desired wavelengths to be received.

The photodetector 224 has an anode terminal A and a cathode terminal C. The anode terminal A of the photodetector 224 couples into the single input of the amplifier Pre-Amp 228. The cathode terminal C of the photodetector 224 couples to the photodetector pin PD 216C so that a photocurrent Ipd can be externally provided and measured outside of the device package 202 of the optical receiver 200. The cathode terminal C of the photodetector 224 also couples to a first terminal of the capacitor C 226.

The photodetector 224 is a transducer capable of accepting an optical signal or light signal 201 and producing an electrical signal containing the same information as in the optical signal. The electrical signal is the photocurrent Ipd and is synonymous (i.e., may also be referred to as) a light current. The photocurrent Ipd is an electrical current generated in the photodetector 224. In one embodiment, the photocurrent Ipd results from the absorption of electromagnetic radiation, such as light energy, from the optical signal or light signal 201. In other embodiments, the photocurrent may be the result of photovoltaic or photoemissive effects.

The level of electric current of Ipd is a function of the incident electromagnetic power. An equation to estimate Ipd in response to incident optical power P is $Ipd=MneP/hf$ where M is the detector's gain, n is the detector's quantum efficiency, h is Plank's constant, e is the magnitude of the charge of an electron, and f is the optical frequency of the incident light.

Some important characteristics of a photodetector are its speed or time of response, spectral response, dynamic range, internal gain or amplification, sensitivity, responsivity, device geometry (i.e., detector area), signal quality or strength, and noise (i.e., dark current).

Within the circuit of FIG. 2A, the photodetector acts like a variable load or impedance to the average current measuring circuit which varies the photocurrent in proportion to the amount of light that illuminates the photodetector 224.

The amplifier Pre-Amp 228 is preferably a low noise amplifier designed to receive a weak signal input. An exemplary discrete amplifier for the amplifier Pre-Amp 228 is a low noise transimpedance pre-amplifier model number MAX3266/MAX3267 manufactured by Maxim Integrated Products. As mentioned previously, the amplifier Pre-Amp 228 may be integrated with the photodetector 224. The anode terminal A of the photodetector 224 couples into the input of the amplifier Pre-Amp 228. A high level power supply terminal VCC of the amplifier Pre-Amp 228 couples to the power pin VCC 216A. A low level power supply terminal GND of the amplifier Pre-Amp 228 couples to the header 212 or alternatively the ground pin GND 216B. The amplifier Pre-Amp 228 may be single ended (i.e., a single output terminal Out+ or Out−) or double ended (i.e., two output terminals Out+ and Out−). In a preferred embodiment, the amplifier Pre-Amp 228 is double ended with the output terminal Out+ coupling to the DATA pin 216D and the and output terminal Out− coupling to the DATA_BAR pin 216D to provide a differential data output. With the amplifier pre-amp 228, the packaged optical receiver 200 may also be referred to as a photodetector/pre-amplifier package.

The capacitor Cpd 226 may be integrated with the amplifier Pre-Amp 228 and/or the photodetector 224 on the same substrate or die or capacitor Cpd 226 may be a discrete device electrically wired or coupled to the amplifier Pre-Amp 228 and the photodetector 224. In a preferred embodiment, the capacitor Cpd 226 is a discrete chip capacitor. The capacitor Cpd 226 may provide filtering to increase the signal-to-noise (S/N) ratio. The capacitance value of Cpd 226 may be selected to filter out particular frequencies of noise that may be expected. Capacitor Cpd 226 couples between the photodetector pin PD 216C and the header 212 (or alternatively the ground pin 216B if isolated from the header 212). The header 212 is coupled to the ground pin GND 216B of the device package 202 and optical receiver 200. The capacitor Cpd 226 filters out noise from the photodetector pin PD 216C to ground. Similarly optional capacitor Cps 227, if provided, may filter out noise from the power supply pin VCC 216A to ground.

In operation, the optical signals or light signals 201 having the optical power input (OPin) are sent from a separate optical transmitter through a transmission medium (such as a fiber optic cable) capable of carrying light at the wavelength and power level of the optical transmitter. The optical signal 201 includes modulation to represent the information being communicated.

The optical signals or light signals 201 are coupled into the photodetector 224 through the window 214. To the extent that the modulation causes the optical signal or light signal 201 to have a variation in an optical power level, the photocurrent (Ipd) is induced in the photodetector to represent the received optical signal. As there is a direct correlation between the level of photocurrent of the photodetector and the level of received optical power, a measure of average photocurrent represents the average optical power level at the optical receiver 200. That is, the average optical power level at the optical receiver 200 is equivalent to the measure of average photocurrent multiplied with a constant. In an equation format, OPave=k×Ipdave represents the correlation where OPave is the average optical power level, Ipdave is the measure of average photocurrent and k is the scalar constant.

The average current measuring circuit 204 is coupled to the photodetector pin PD 216C to measure the photocurrent Ipd and produce a representation of the magnitude of average photocurrent Ipdave to a user. The representation of the average photocurrent Ipdave may be in the form of a voltage, a current, or a digital binary number. This representation can include a conversion factor or scaling factor 258, such as k, so that it directly represents units of optical power according to the equation OPave=k×Ipdave. If an offset Off is provided, the equation becomes OPave=k×Ipdave+Off, and the reference to scaling or scaling factor 258 includes both the slope multiplier k and the offset Off. Curve 282 of FIG. 2F illustrates such a case in comparison with the unscaled curve 280. Curve 284 of FIG. 2F illustrates a more sophisticated case where curve fitting is used over ranges of IPDave in comparison with the unscaled curve 280. For a first part of curve 284, the equation OPave1=k1×Ipdave+Off1 may be used. For a second part of curve 284, the equation OPave2=k2×Ipdave+Off2 may be used. So on and so on, such that for an Nth part of curve 284, the equation OPaveN=kN×Ipdave+OffN may be used over a range of IPDave. Instead of linear curve fitting, polynomial curve fitting may be used where the equation is OPaveN= (gN×Ipdave$^2$)+(kN×Ipdave)+OffN for a second order polynomial with gN being another constant, for example.

Figure 2C:
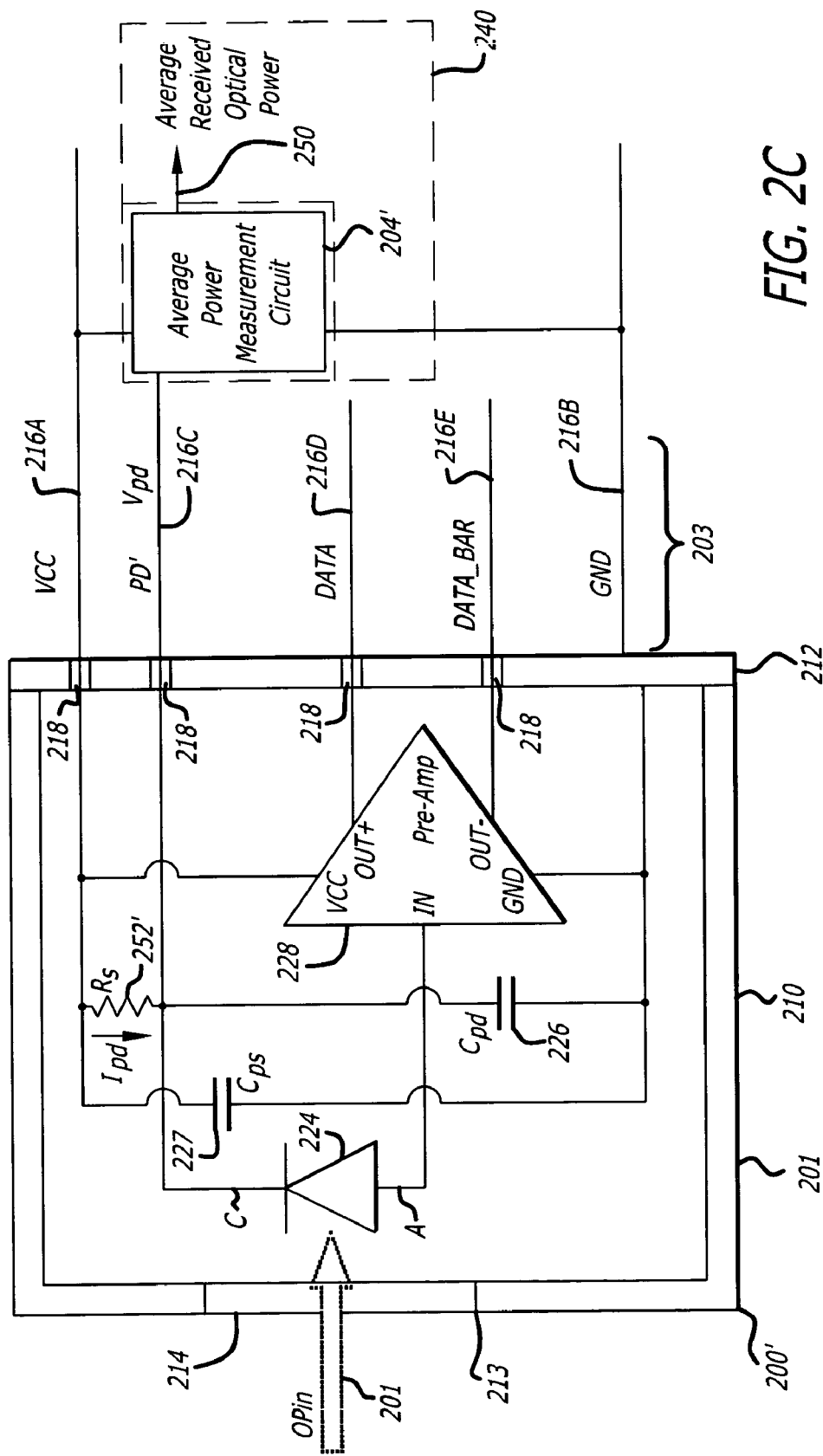
FIG. 2C is a schematic diagram illustrating another embodiment of the methods, systems, and apparatus for measuring the average receive optical power.
Figure 2D:
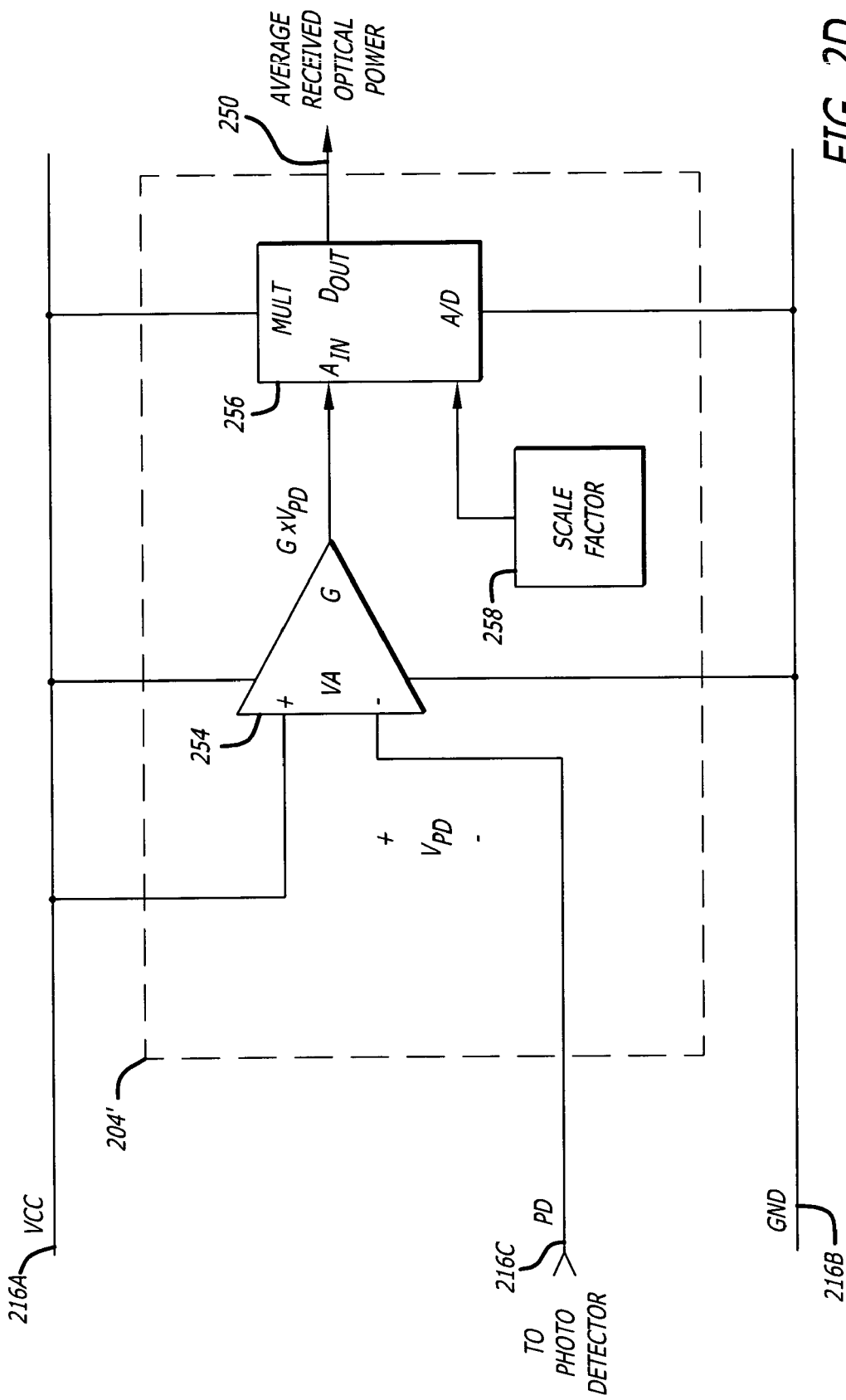
FIG. 2D is a schematic diagram illustrating an exemplary embodiment of an average power measuring circuit for FIG. 2C.

Referring now to FIGS. 2C–2D schematic diagrams of another embodiment of the methods, systems, and apparatus for measuring the average receive optical power is illustrated. FIG. 2C illustrates a packaged optical receiver 200' coupled to an average power measurement circuit 204'. The packaged optical receiver 200' further integrates a sense resistor Rs 252' into the device package in comparison with the embodiment of FIGS. 2A–2B. That is the sense resistor Rs 252' is mounted within the interior 222 of the packaged optical receiver 200' whereas the sense resistor Rs 252 is external to the packaged optical receiver 200. In a preferred embodiment, the sense resistor Rs 252' is integrated with the amplifier Pre-Amp 228 of the optical receiver 200'.

The average current measurement circuit 204 is altered removing the sense resistor Rs 252 to form an average power measurement circuit 204' as a different electrical signal, Vpd, is being generated out from the packaged optical receiver 200' on the photodetector pin PD 216C. FIG. 2D is a schematic diagram illustrating an exemplary embodiment of the average power measuring circuit for FIG. 2C. The average power measuring circuit 204' may be integrated with a monitoring circuit 240 or otherwise may or may not couple thereto.

Because the average current measurement circuit 204 and the average power measurement circuit 204' in combination with the photodetector 224 function to detect an optical power level in the received light signal and to determine an average optical power level for the received light signal, they may alternatively be referred to as power measurement circuits.

Figure 2E:
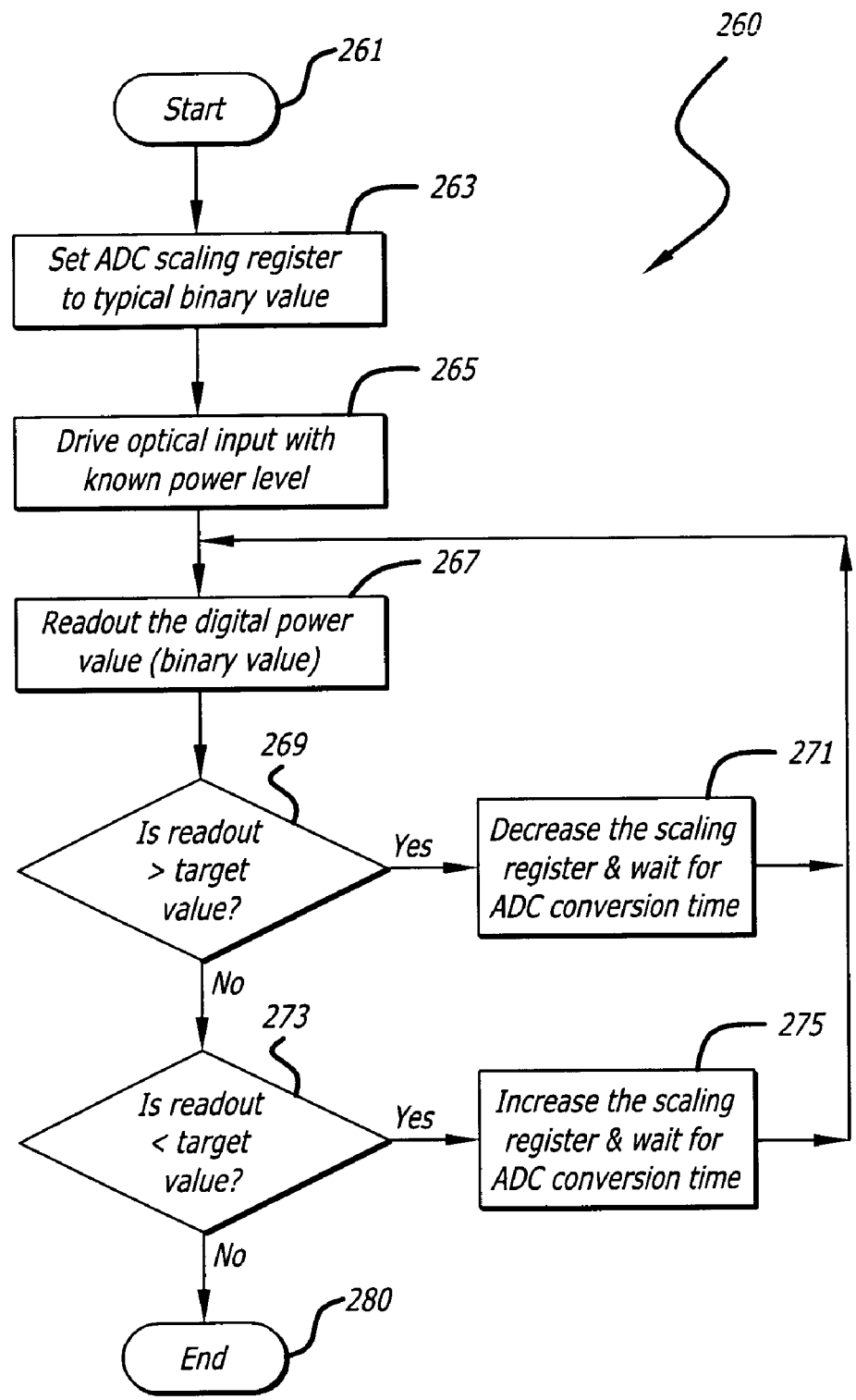
FIG. 2E is a flow chart diagram illustrating a method of calibrating average current measuring circuit to provide a measure of the average receive optical power.

Referring now to FIG. 2E, a flow chart diagram illustrating a method of calibrating the average current measuring circuit and the scaling factor to provide a measure of the average receive optical power is illustrated. The methods of calibrating the average current measuring circuit are typically used after the optical receiver and the average current measuring circuit are assembled into a higher order assembly such as that illustrated by the fiber optic modules described below and illustrated in FIGS. 5A–5B, 6A–6B, and 7–10C. In this way, the scaling factor can compensate for optical losses in the elements of the fiber optic module such as the mechanical alignment, the lenses, and the reflectors, if any, as well as the optical losses in the packaged optical receiver itself, such as optical losses that may be generated by the window of the device package, for example. Further, the response of the photodetectors 224 may be linear over a range of optical power, referred to as a dynamic range. However, the optical coupling efficiencies from packaged optical receiver to packaged optical receiver and from fiber optic module to fiber optic module vary from part to part. Thus, the scaling factor compensates for such optical coupling efficiencies so that each part provides a more uniform average received optical power level in comparison with the others.

A first embodiment of the calibration method starts at block 261 and then goes to block 263. At block 263, the scaling register of the analog to digital converter is set to a typical binary value. Next at block 265, an optical input signal of a known power level is provided to the optical receiver 200. Next at block 267, a digital power value is read or measured from the average current measuring circuit 204 at output 250. The digital power value is a binary value from the analog to digital converter.

Next at block 269, a determination is made as to whether readout or measured digital power value is greater than a target value. If the determination at block 269 is yes, the method jumps to block 271. If the determination at block 269 is no, the method goes to block 273.

In the case of yes, the readout or measured optical power value is greater than the target value, at block 271 the binary value in the scaling register (i.e., the scaling factor) of the analog digital converter is decreased. A period of time is allowed in order for the analog to digital converter to settle. The period of time is typically greater than or equal to the analog to digital converter conversion time. After performing block 271, the method jumps back to block 267. At block 267 once again the digital power value is read at output 250 form the average current measurement circuit 204.

In the case the determination is no at block 269, the readout or measured optical power value is less than or equal to the target value, block 273 is executed. At block 273, a determination is made whether the readout or measured optical power value is less than the target value. If the determination at block 273 is yes, the method jumps to block 275. If the determination at block 273 is no, the method ends at block 280.

In the case the readout or measured optical power value is less than target value and the method has jumped to block 275, the value in the scaling register is increased and a period of time is waited for the analog to digital converter to settle. The period of time waited is greater than or equal to the analog to digital converter conversion time. After completing the block 275, the method jumps back to block 267 where the digital power value at output 250 on the average current measurement circuit 204 is read or measured once again.

The method continues in a loop until the scaling register has a value in which the digital readout of the measured optical power value of the average received optical output 250 of the average current measurements circuit 204 is equal to the target value.

The calibration method may alternatively be performed by providing a light signal with a known optical power level to the optical power measuring system (i.e., the optical receiver, an averaging circuit, and optionally a monitoring circuit), measuring an average optical power level in the light signal using the optical power measuring system, comparing the measured average optical power level with the known optical power level of the light signal; and if the comparing determines a difference, adjusting a scaling factor in the optical power measuring system to reduce the difference. The scaling factor may be adjusted to reduce the difference to substantially zero. The scaling factor scales a level of an electrical signal to change the measured average optical power level. In the case a photodetector is used to sense the optical power level in the light signal, the electrical signal is a level of photocurrent. In using digital circuitry as opposed to using analog circuitry to determine an average optical power level, the scaling factor is a digital value and the level of the electrical signal is a digital value which are multiplied together to change the measured average optical power level. After adjusting the scaling factor, the comparing of the measured average optical power level with the known optical power level can be repeated to determine if there is still a substantial difference that should be substantially zeroed out.

Referring now to FIG. 3A, a magnified cross sectional view of a packaged optical receiver 300 is illustrated. The packaged optical receiver 300 may also be referred to herein as a packaged photodetector, a packaged photodiode or a packaged light sensor because they are used in communication systems to receive data carried by light signals and transduce the light signals into electrical signals.

The packaged optical receiver 300 includes a window can or cap 312, a header 314, and pins or leads 316 of a device package 301. The pins 316 of the device package 301 may extend through and may be isolated from the header 314 such as pins 316A. One of the pins 316 of the device package 301, such as a pin 316A, is for the direct connection to the photodetector 224 in order to directly monitor the photocurrent and determine a measure of the average received optical power in the light signals. One pin 316B of the pins 316, may be electrically coupled to the header 314 to provide a common ground connection.

In a preferred embodiment, the device package 301 is a thin outline (TO) type of device package, such as a TO-46, with the window can or cap 312 being a window TO can or cap and the header 314 a TO header. In a preferred embodiment, the device package 301 includes five pins 316, such as pins 216A–216E illustrated in FIG. 2A, one of the five being the pin for the direct connection to the photodetector. The header 314 generally provides mechanical support and allows electrical connections to made to the one or more pins 316. The header 314 may also provides a common surface to which components may mount and to which a common ground connection may be made. The window can or cap 312 generally provides a hermetic seal to the header 314 to enclose one or more devices, and allows light signals to pass in through a window into the package.

The window can 312 includes a lip 313, a top 317, a window 318, and a window opening 319 as shown and illustrated. The lip 313 of the slanted window can 312 is for sealing to a surface of the header 314. The window 318 of the window can 312 is transmissive to a light beam and allows the light beam to pass through it. The window 318 is preferably a glass window but may be formed of a plastic or other transparent material to the desired wavelengths of light to pass through. The window opening 319 allows light to enter into the package 300 from space or a fiber optic cable or other optical transmission media. The window can 312 may further include a can tab (not shown) that mates with a slot (not shown) in the header 314 for proper alignment thereof.

The window 318 is hermetically sealed to the inside surface of the window can 312. More particularly, the window 318 is hermetically sealed to the inside surface of the top 317 of the window can 312. The window 318 may have a circular shape and a diameter to cover over the window opening 319 in the top 317 in order to seal out dust and dirt. The hermetic seal between the window 318 and the window can 312 further prevents moisture from seeping inside into the interior of the packaged optical receiver 300.

Inside the packaged optical receiver 300 is the photodetector 324, such as a semiconductor photodiode. In a preferred embodiment, the photodetector 324 mounts to a chip capacitor 326. The photodetector 324 and the chip capacitor 326 function as the photodetector 224 and the capacitor Cpd 226 previously described with reference to FIG. 2A. The chip capacitor 326 is attached to a surface of the header flange 334 of the header 314. Each of the pins 316A which extend through the header 314 includes a header post portion 336 extending above the header to which electrical connections may be made to the respective pin.

Referring now to FIG. 3B, a cutaway top perspective view of the packaged semiconductor laser 300 is illustrated. The window 318 is mounted in the package 301 to the inside surface of the top 317 of the window can 312 in order to seal the opening 319. Each of the pins 316A which extend through the header 314 includes a header post portion 336 extending above the header to which electrical connections may be made to the respective pin. Each of the pins 316A which extend through the header 314 have a feedthrough 345 to electrically isolate the pin from the header 314. The feedthroughs 345 are formed of a dielectric material to insulate the pins 316A from shorting to the header 314 and header flange 334. Additionally, the feedthroughs 345 provide a hermetic seal around the pins 316A to seal base of the package and keep dirt and moisture out of the interior of the package. In one embodiment, the feedthroughs 345 are formed of glass. The windowed can 312 is coupled to the header 314 to seal the top of the package.

As discussed previously, the window opening 319 and the window 318 allow light to enter into the package 300 from space or a fiber optic cable or other optical transmission media and be coupled into the photodetector 324. The window 318 in alternate embodiments may also be shaped as a lens to focus light onto the photodetector 324. In yet another alternate embodiment, the lens may couple to the exterior surface of the top 317 of the can 312 and/or be coupled into the opening 319 of the can 312.

The window 318 may itself cause a loss in the optical power of the light 201 incident on the receiver 300. The window 318 may be on a slight angle if misaligned and reflect or refract a portion thereof. Additionally, optical coatings may be applied to the window 318 to filter out certain undesirable wavelengths of light or to reduce external reflections or induce internal reflections which also may cause a loss of optical power before the light or photons actually reach the photodetector 224. It is desirable to minimize any optical power losses in the window 318 and other sources of optical losses so that a majority of the optical power of the light 201 is incident upon a light detection area of the photodetector 224.

Referring now to FIG. 3C, a magnified bottom perspective view of the optical receiver 300 is illustrated. The windowed can 312 is coupled to the header 314 of the device package 301. The pins 316A extend through the header 314 surrounded by the feedthroughs 345. The pin 316B couples to the base of the header 314 in order to make an electrical connection thereto.

Figure 4A:
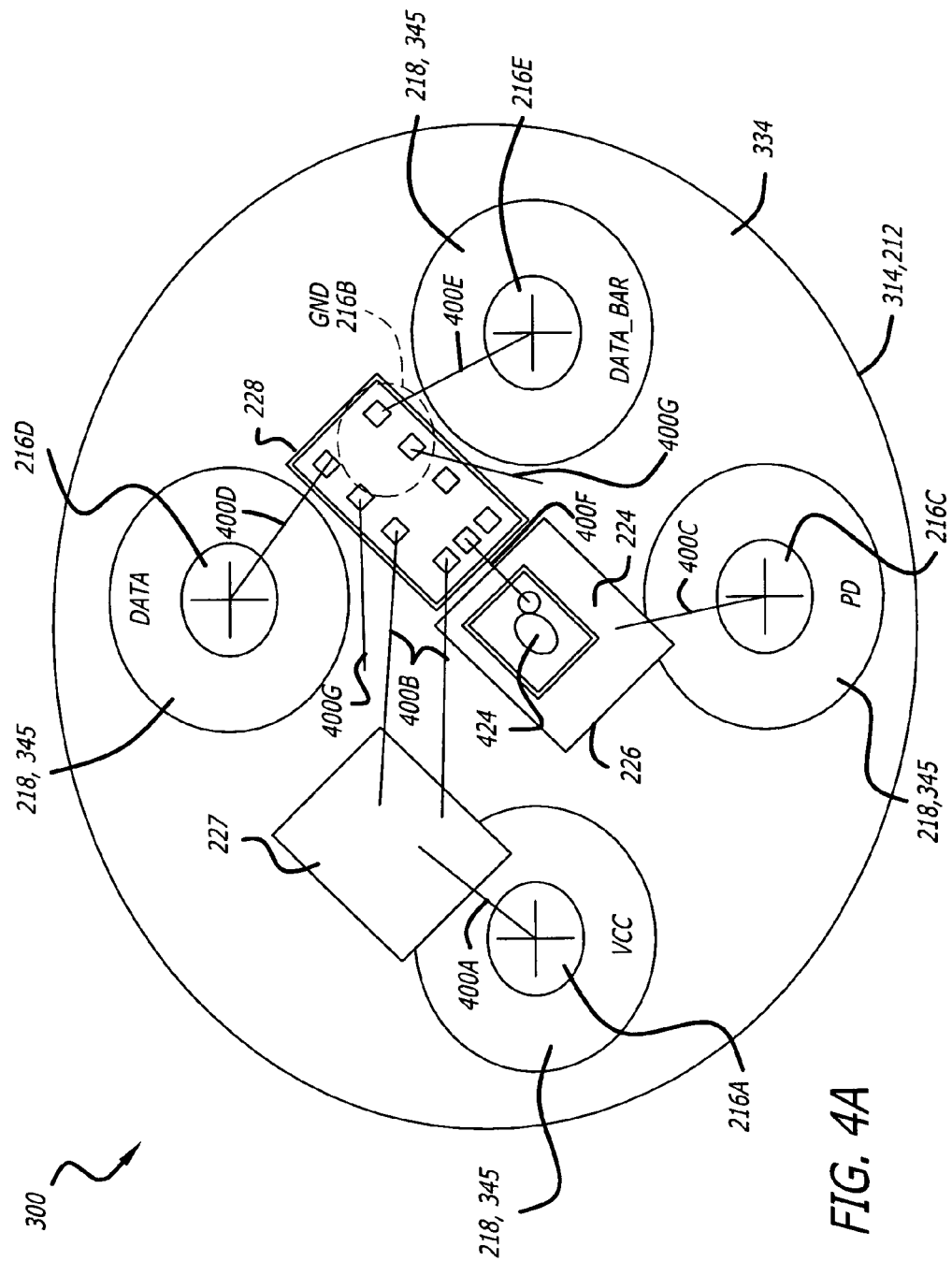
FIG. 4A is a magnified top perspective view of an exemplary bonding diagram of elements that may be included in the packaged optical receiver for measuring the average receive optical power.

Referring now to FIG. 4A, is a magnified top perspective view of an embodiment of the packaged optical receiver 300 without the window can 312 assembled thereto. FIG. 4A illustrates an exemplary bonding diagram of elements that may be included in the packaged optical receiver 300 for measuring the average receive optical power. The exemplary bonding diagram of the packaged optical receiver 300 corresponds to the schematic diagram of elements of the package optical receiver 200 illustrated in FIG. 2A.

In FIG. 4A, bond wire interconnects or bond wires (generally referred to as 400) are illustrated forming electrical connections between elements of the packaged optical receiver 300. Pins PD 216C, VCC 216A, DATA 216D, and DATA_BAR 216E extend through the header 314, 212 by means of the feedthroughs 218, 345. The ground GND pin 216B couples to the base of the header 314,212 so that the header flange 334 is electrically coupled to the ground GND pin 216B.

Electrically coupled and physically mounted to the header flange 334 of the header are the chip capacitors Cpd 226 and Cps 227, and the amplifier Pre-Amp 228. The photodetector 224 is physically mounted to a top side of the chip capacitor Cpd 226. In the embodiment illustrated in FIGS. 4A–4B, the photodetector 224 makes a bottom side electrical contact to the top side of the chip capacitor Cpd 226 in order to be electrically coupled thereto as well.

Bond wire 400A electrically couples the VCC pin 216A to the top terminal of the chip capacitor Cps 227 if its present. Otherwise if the chip capacitor Cps 227 is not used, one or more bond wires 400A may be used to directly couple the VCC pin 216A to the one or more VCC terminals of the pre-amp 228. The one or more bond wires 400B electrically couple the top terminal of the chip capacitor Cps 227 to one or more VCC terminals of the pre-amp 228. A bottomside contact between the chip capacitor Cps 227 and the header flange 334 electrically couples the bottom terminal of the chip capacitor Cps 227 to the header flange 334 and the ground GND pin 216B.

Bond wire 400C, electrically couples the photodetector PD pin 216C to the top terminal of the chip capacitor Cpd 226. A bottomside contact between the chip capacitor Cpd 226 and the header flange 334 electrically couples the bottom terminal of the chip capacitor Cpd 226 to the header flange 334 and the ground GND pin 216B.

Bond wire 400D electrically couples the DATA pin 216D to the data out terminal of the pre-amp 228. Bond wire 400E electrically couples the DATA_BAR pin 216E to the data_bar out terminal of the pre-amp 228.

Bond wire 400F electrically couples the anode A of the photodetector 224, by means of a top side surface contact, to the input terminal of the pre-amp 228. In one embodiment, the cathode C of the photodetector 224 electrically couples to the top terminal of the chip capacitor Cpd 226 by means of a bottom side contact.

Figure 4B:
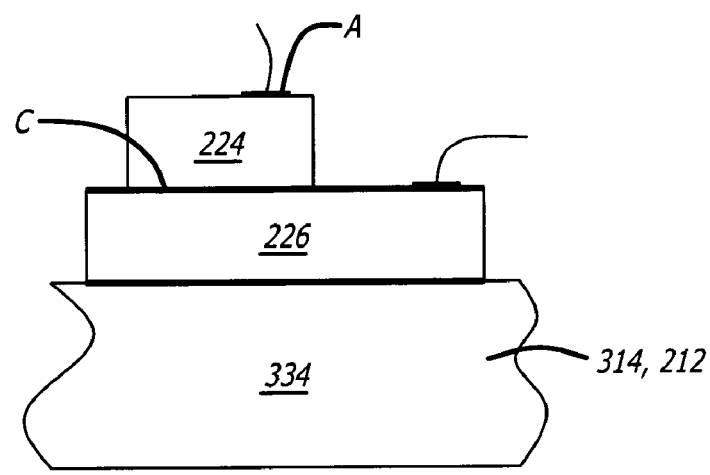
FIG. 4B is a magnified cross sectional side view of an exemplary mounting of a photodetector and capacitor.

FIG. 4B illustrates the bottom side contacts made (1) between the cathode C of the photodetector 224 and the top terminal of the chip capacitor Cpd 226, and (2) between the bottom terminal of the chip capacitor Cpd 226 and the header flange 334 of the header 314,212 in greater detail. The top side contact made to the photodetector 224 is to the anode A terminal thereof. The top terminal of the chip capacitor Cpd 226 couples to the bottom side of the photodetector 224 which is the cathode C terminal.

The one or more bond wires 400G electrically couple the one or more GND terminals of the pre-amp 228 to the header flange 334 and the ground GND pin 216B.

It is understood that the foregoing discussion is exemplary of bonding elements of the optical receiver together and that the elements may be bonded in a number of differing ways using different terminals, contact surfaces, bonding pads, or different device types.

Figure 4C:
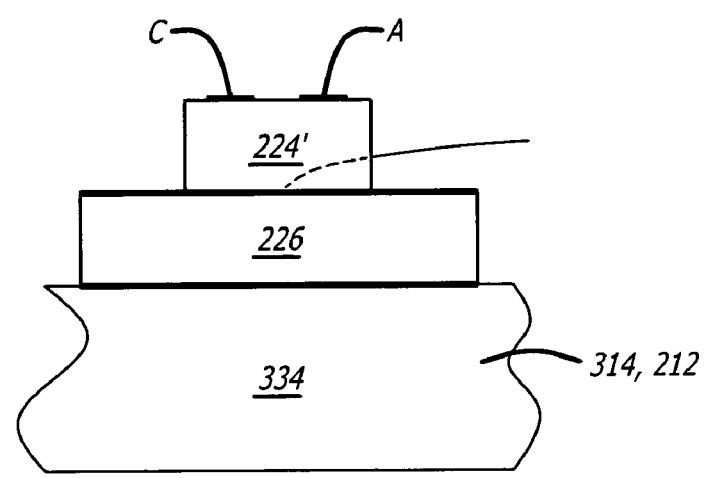
FIG. 4C is a magnified cross sectional side view of another exemplary mounting of a photodetector and capacitor.

For example, refer now to FIG. 4C illustrating an alternate contact arrangement to the anode A and cathode C terminals of a photodetector 224'. Both the anode A and cathode C terminals of the photodetector 224' are located on a top side surface. There may be no bottom side contact made between the bottom surface of the photodetector 224' and the top terminal of the chip capacitor Cpd 226. In which case, an extra bond wire may be used to electrically couple the cathode C terminal of the photodetector 224' to the photodetector PD pin 216C.

Referring back to FIG. 4A, in order to transduce light or photons into an electrical signal or electrons, the photodetector 224 includes a light detecting area 424. The light detecting area 424 receives the light or photons 210 in order to generate a photocurrent. In a preferred embodiment, the center of the light detecting area 424 is centered on the optical axis of the packaged optical receiver 300. However, alignment and mounting of the photodetector 224 may not be perfect and the center of the light detecting area 424 may be off of the center of the optical axis. Furthermore, the photodetector 224 may be mounted on a slight angle so that the surface of the light detecting area 424 is not perfectly perpendicular with the optical axis and thereby reduces the efficiency of receiving light to generate a photocurrent. The size of the light detecting area 424 should be sufficient to receive the light from the optical fiber. If a lens is used to focus the light into the optical receiver, the light detecting area 424 of the photodetector 224 may be somewhat smaller.

Figure 5A:
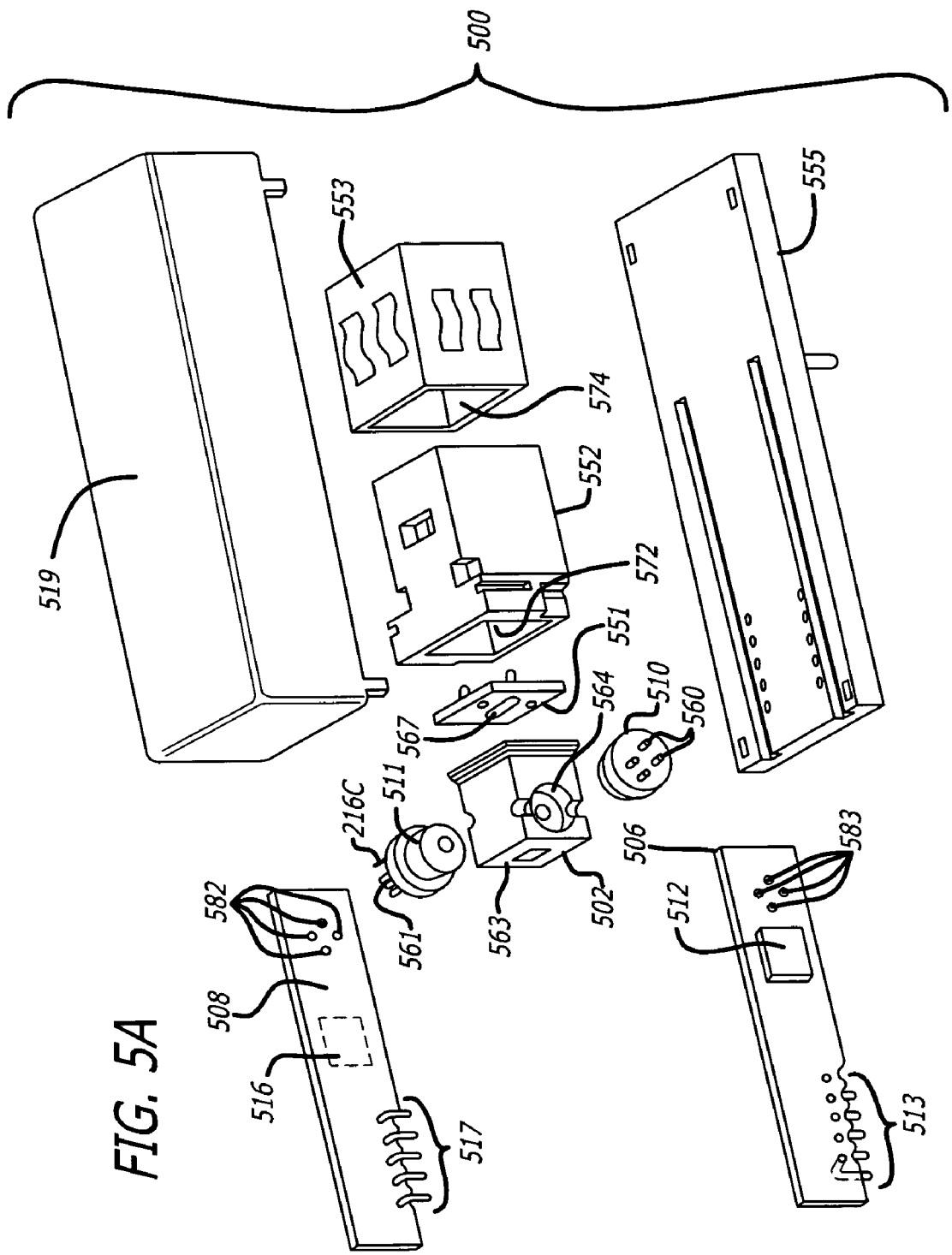
FIG. 5A is an exploded view of an first exemplary fiber optic module including an optical block to illustrate a higher order assembly of the packaged optical receiver.
Figure 5B:
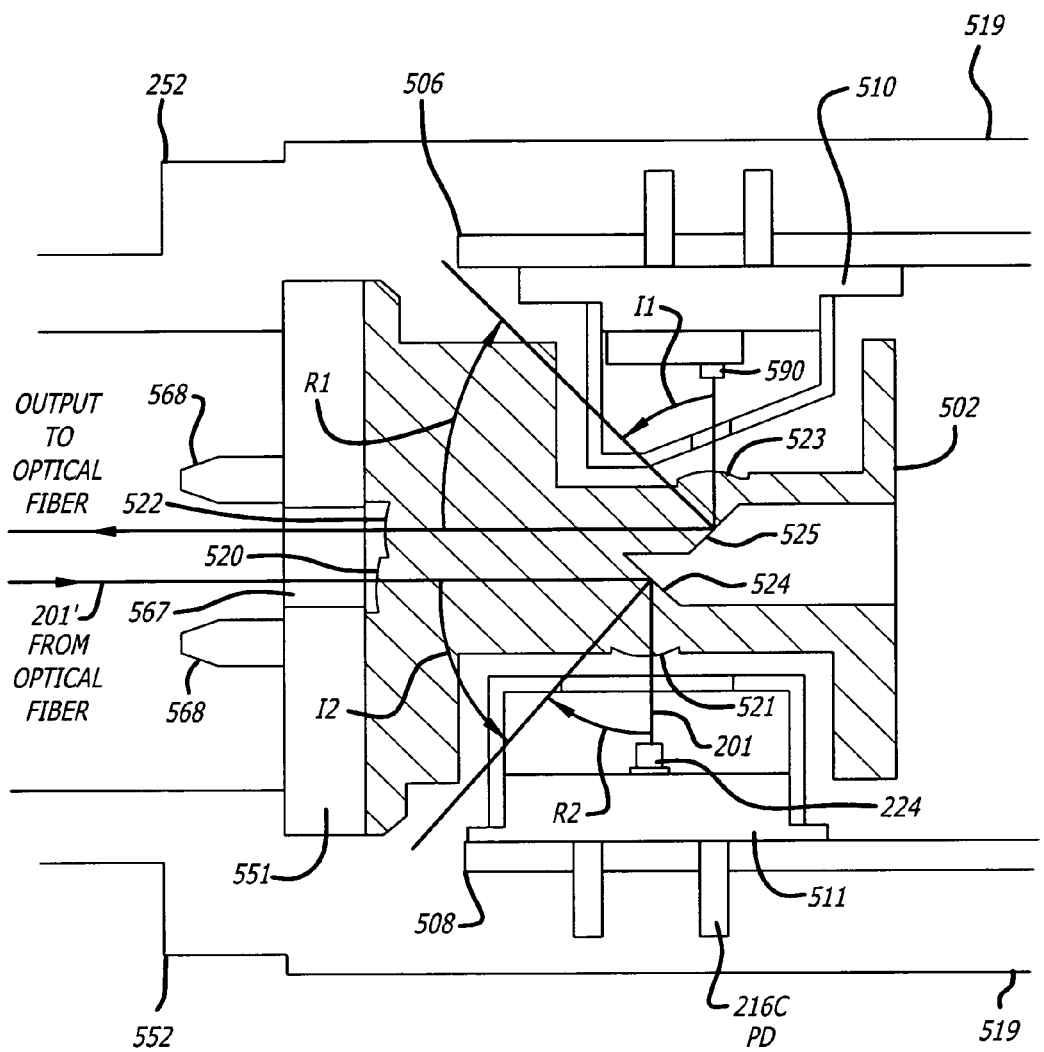
FIG. 5B is a cutaway side view of the packaged optical receiver mechanically coupled to the optical block illustrated in FIG. 5A.

Referring now to FIG. 5A, an exploded view of a Fiber Optic Transceiver Module 500 is illustrated. FIGS. 5A–5B illustrates how a packaged receiver 511 is assembled into an optical block 502. The packaged receiver 511 is the packaged optical receiver 200, 200', or 300 and their embodiments previously described.

The Fiber optic transceiver module 500 includes an optical block 502, a transmit printed circuit board (PCB) 506, a receive printed circuit board PCB 508 (I don't see this on the Figure), a packaged transmitter 510, a packaged receiver 511, a cover 519, an alignment plate 551, a nose receptacle 552, a nose shield 553, and a base 555. The alignment plate 551 provides alignment between the optical block 502 and a fiber optic cable plugged into the nose receptacle 552. The nose receptacle 552 includes an optical fiber opening 572 to receive an optical fiber connector and hold the optical fiber substantially fixed and aligned in place. The nose shield 553 includes an opening 574 for insertion over the nose receptacle 552 and is conductive to reduce EMI.

The packaged transmitter 510 and packaged receiver 511 are optoelectronic devices. An optoelectronic device is a device which can convert or transduce light or photons into an electrical signal or an electrical signal into light or photons. The packaged transmitter 510 includes a semiconductor laser diode that converts an electrical signal into light or photons. The packaged receiver 511 is a packaged photodetector, that detects or receives light or photons and converts them into an electrical signal and is also preferably package in a TO can. The packaged transmitter 510 is inserted into an opening 564 in the optical block 502 and epoxied thereto. The packaged receiver 511 is inserted into an opening 563 in optical block 502 and epoxied thereto.

The packaged transmitter 510 has terminals 560 to couple to through-holes 583 of the transmit PCB 506. The terminals 560 are soldered to make an electrical connection to the transmit PCB 506. The transmit PCB 506 includes electrical components 512 such as the laser driver circuitry and pins 513. The electrical components 512 control the packaged transmitter 510 and buffer the data signal received from a system through pins 513 for transmission over an optical fiber.

The packaged receiver 511 has terminals 561 to couple to through-holes 582 of the receive PCB 508 one of which is the photodetector pin PD 216C. The terminals 561 are soldered to make an electrical connection to the receive PCB 508. The receive PCB 508 includes electrical components 516 such as a receiver integrated circuit (transimpedance amplifier and post amplifier), and pins 517. The electrical components 516 control the packaged receiver 511 and buffer the data signal received from an optical fiber. The electrical components 516 further include the average current measuring circuit 204 or the average power measurement circuit 204' and/or the monitoring circuit 240 previously described.

Referring now to FIG. 5B, a cross-sectional view of the optical block 502 is illustrated assembled in the fiber optic module 500. The package transmitter 510, the packaged receiver 511, and the alignment plate 551 are coupled to the optical block 502. The optical block 502 includes lenses 520–523 and reflectors 524–525. Lens 523 is for collimating the light or photons diverging from the packaged transmitter 510. Lens 522 is for focussing the collimated light or photons into an optical fiber. Lens 520 is for collimating the light or photons diverging out from the end of an optical fiber into the optical block 502. Lens 521 is for focusing the collimated light or photons into the packaged receiver 511. Reflectors 524–525 are forty five degree angle facets formed in the optical block 502 to provide total internal reflection and redirect the light rays between the optical fibers and the optoelectronic devices. The facets may be coated with a reflective surface or mirror surface to reflect light or photons off the reflective coated surface or facets having an optical grating surface to reflect photons.

The packaged transmitter 510 includes a semiconductor laser diode 590, such as a vertical cavity surface emitting laser (VCSEL), to generate light signals for transmission over an optical fiber in response to electrical signals.

The packaged receiver 511 includes a semiconductor photodetector such as a photodiode for the generation of electrical signals in response to receiving light signals. The electrical signals form the packaged receiver 511 are coupled into the receive PCB 508.

Light or photons 201' from an optical fiber are coupled into lens 520 through an optical port 567 in the alignment plate 551 on a first optical axis. The lens 520 focuses the light or photons 201' onto the reflector 524 at an incident angle I2 (angle with the perpendicular to reflector 524 surface) of substantially forty five degrees. Reflector 524 reflects the incident light or photons on an angle R2 (angle with the perpendicular to reflector 524 surface) equivalent to incident angle I2 of substantially forty five degrees. The reflected light or photons travel perpendicular to the incident light or photons towards the lens 521. Lens 521 focuses the light or photons 201' from the reflector 524 on a second optical axis perpendicular to the first into the packaged receiver 511 as the light or photons 201. There may be optical loses from the fiber into the packaged receiver reducing the optical power in the light 201' into the level of optical power in the light 201. These losses may occur from the alignment mechanisms, the lenses 520, 521, and the reflector 524. Thus, the optical block 502 receives light or photons from an optical fiber over the first optical axis and redirects it into a second optical axis substantially perpendicular to first to couple the light or photons into the packaged receiver 511.

Figure 6A:
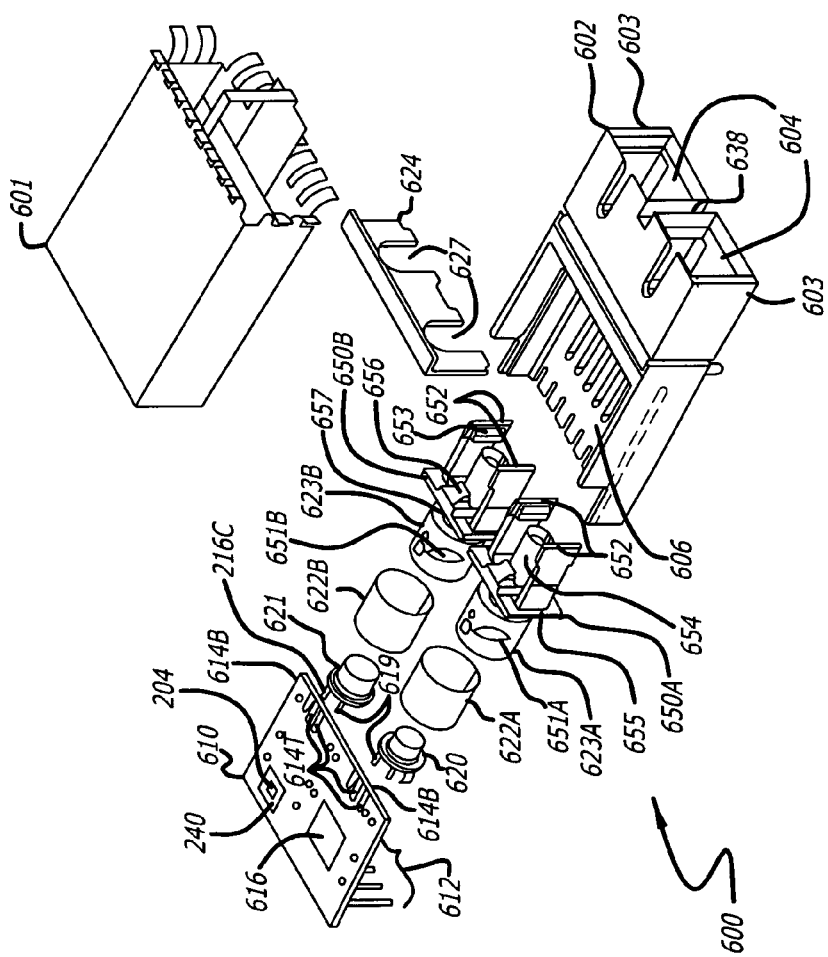
FIG. 6A is an exploded view of a second exemplary fiber optic module including a fiber optic plug with a lens to illustrate a higher order assembly of the packaged optical receiver.
Figure 6B:
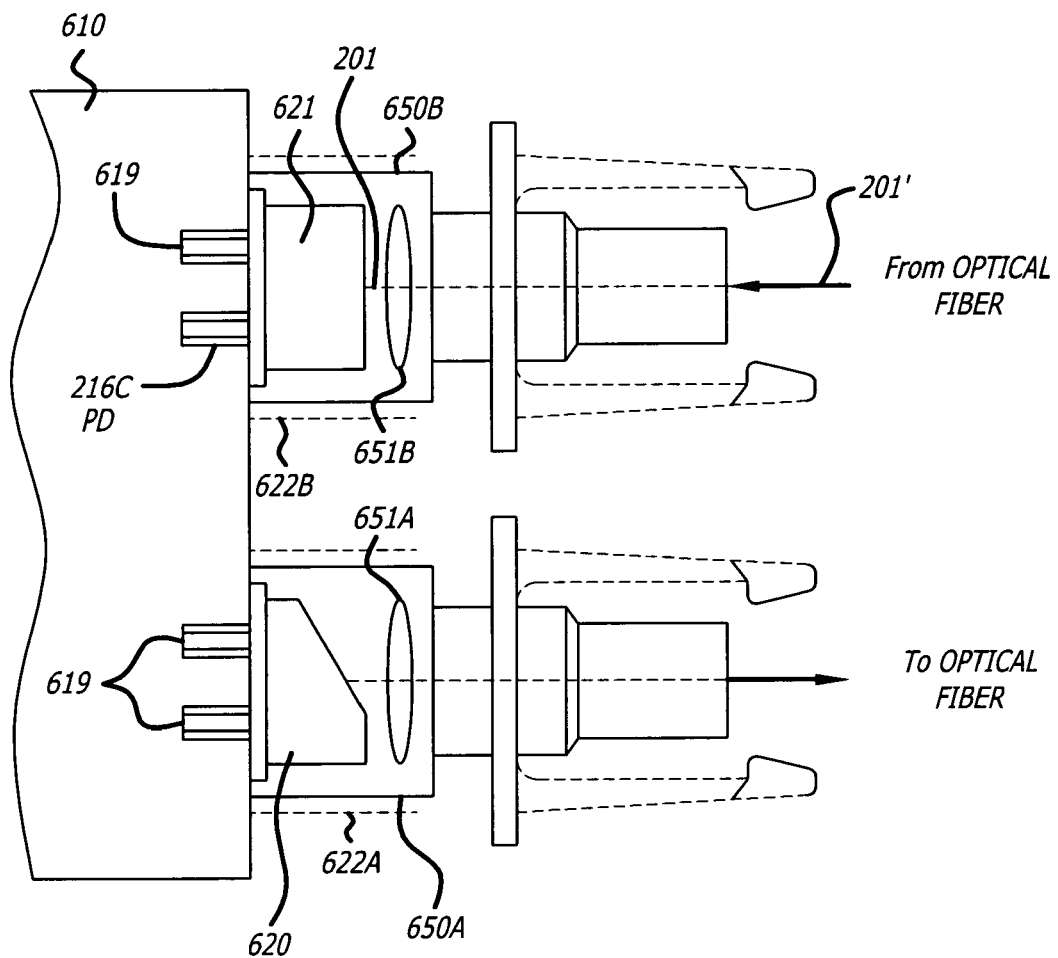
FIG. 6B is a cutaway side view of the packaged optical receiver mechanically coupled to the fiber optic plug including a lens as illustrated in FIG. 6A.

Referring now to FIG. 6A, an exploded view of a fiber optic module 600 is illustrated. FIGS. 6A–6B illustrate how a packaged semiconductor photodetector or receiver 621 is assembled into an SC fiber optic plug or connector 650B. The packaged receiver 621 is the packaged optical receiver 200, 200', or 300 and their embodiments previously described.

The fiber-optic module 600 includes a cover 601, a module chassis frame 602, a printed circuit board (PCB) 610, a packaged transmitter 620, a packaged receiver 621, a pair of shielding collars 622A and 622B, a pair of SC fiber optic plugs or connectors 650A and 650B, and a U-Plate 624. The optical, electrical and opto-electronic components of the fiber-optic module 600 are assembled into the module chassis frame 602 and the cover 601 is then fitted to the module chassis frame 602.

The module chassis frame 602 includes optical connector receptacles 603 (including openings 604), and a base 606. The openings 604 are SC optical connector openings for a duplex SC optical connection. The optical connector openings 603 are separated by a slot 638.

The packaged receiver 621 includes the photodetector 224 for receiving optical signals and includes the photodetector pin PD 216C. The packaged transmitter 620 may include the vertical cavity surface emitting laser (VCSEL) for transmitting optical signals. The device package of the package transmitter 620 and the packaged receiver 621 may modeled after a standard TO type package. Each of the packaged transmitter 620 and receiver 621 have one or more terminals 619 which couple to the edge traces 614 on each side of the printed circuit board 610. One of the terminals 610 of the packaged receiver 621 is the photodetector pin PD 216C.

The printed circuit board 610 includes one or more PCB signal pins 612, edge traces 614 on each side for mounting the packaged transmitter 620 and the packaged receiver 621, and one or more integrated circuits 616 for processing signals between the signal pins 612 and the packaged transmitter 620 and the packaged receiver 621. The one or more integrated circuits includes the receiver circuitry previously discussed including the average current measuring circuit 204 or the average power measuring circuit 204', and/or the monitoring circuit 240.

The SC fiber optic plugs or connectors 650A and 650B include a lens 651A and 651B mounted inside ports 623A and 623B, respectively. The lenses 651A and 651B are between the fiber ferrules and the TO-cans of the packaged transmitter 620 and packaged receiver 621 respectively. Each of the SC connectors 650A and 650B further includes a pair of snap lock clips 652 each having a retaining protrusion 653, ferrule barrels 654, support struts 656 in a front portion. Each of the SC connectors 650A and 650B further includes circular recesses 657 between each of the headers 623A and 623B and their respective flanges 655 in a rear portion. Each of the circular recesses 657 mates with the U-shaped openings 627 of the U-plate 624.

The packaged transmitter 620 is mounted inside the transmitter port 623A of the SC fiber optic plug or connector 650A to form the Transmitter Optical Subassembly. The shielding collar 622A is slid over the port 623A. The terminals 619 of the packaged transmitter 620 are then soldered onto the PCB 610.

The packaged receiver 621 is mounted inside the receiver port 623B of the SC fiber optic plug or connector 650B to form the Receiver Optical Subassembly. The shielding collar 622B is slid over the port 623B. The terminals 619 of the packaged receiver 621, including the photodetector pin PD 216C, are then soldered onto the PCB 610.

The optical, electro-optical, and the electronic components are assembled into the module chassis frame 602 before the cover 601 encloses it. The front portion of the SC connectors 650A and 650B are inserted into the openings 603 in the nose of the module chassis frame 602. The U-plate 624 is coupled to the module chassis frame so that its U-openings 627 fit into the circular recesses 657 of each respective connector 650A and 650B. The U-plate 624 holds the subassembly of the optical and electrical components coupled into the module chassis frame 602.

Referring now to FIG. 6B, a cross-sectional view of the SC optical plugs or connectors 650A and 650B is illustrated assembled in the fiber optic module 600. The package transmitter 620 is mounted inside the transmitter port 623A of the SC fiber optic plug or connector 650A. The shielding collar 622A is around the port 623A. The terminals 619 of the packaged transmitter 620 are soldered onto the PCB 610. The packaged receiver 621 is mounted inside the receiver port 623B of the SC fiber optic plug or connector 650B. The shielding collar 622B is around the port 623B. The terminals 619 of the packaged receiver 621, including the photodetector pin PD 216C, are soldered onto the PCB 610.

The SC fiber optic plugs or connectors 650A and 650B include the lens 651A and the lens 651B mounted inside ports 623A and 623B, respectively. The lens 651A is between the fiber ferrule 654 and the packaged transmitter 620. The lens 651B is between the fiber ferrule 654 and the packaged receiver 621.

The light or photons 201' are coupled into lens 651B from an aligned optical fiber plugged into the SC fiber optic plug 650A and focused into the packaged receiver 621. The packaged receiver 611 includes a semiconductor photodetector such as a photodiode for the generation of electrical signals in response to receiving light signals. The electrical signals from the packaged receiver 611 are coupled into the PCB 610. Light or photons 201' from an optical fiber are coupled into lens 651B through the plug 650B on a first optical axis. The lens 651B focuses the light or photons 201' into the packaged receiver 611 as the light or photons 201. There may be optical loses from the fiber into the packaged transmitter 621 reducing the optical power from the light 201' into the optical power in the light 201. These loses may occur from the alignment mechanisms and the lens 651B.

As previously discussed, the packaged receiver 621 includes the photodetector 224 for receiving light or photons and generating electrical signals (data on DATA and DATA_BAR pins, and Ipd over PD pin) in response thereto which are coupled onto the PCB 610. The PCB 610 includes the average current measuring circuit 204 or average power measuring circuit 204' and/or the monitoring circuit 204 coupled thereto and to the photodetector pin PD 216C.

Figure 7:
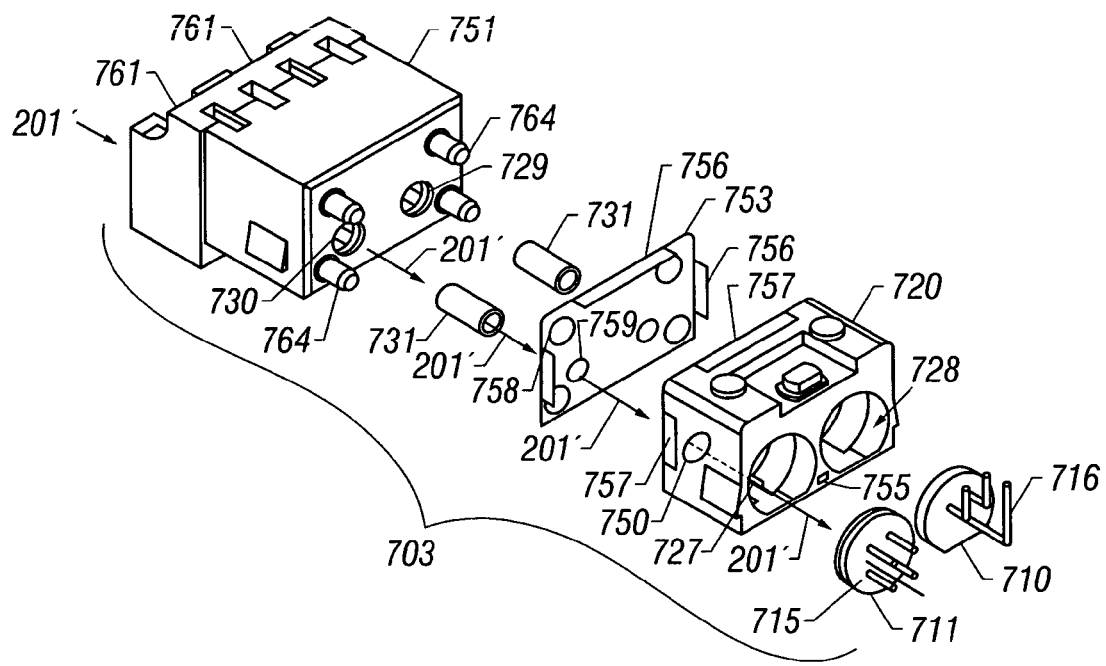
FIG. 7 is a simplified top—exploded view illustrating an optical element for a pluggable fiber optic module.

Referring now to FIG. 7, an exploded view of an optical element 703 for a pluggable fiber optic module 700 is illustrated. The optical element 703 includes a nose receptacle 751, a pair of fiber ferrule sleeves 731, an electromagnetic interference (EMI) shield plate 753, an optical block 720, a light receiver 711 and a light transmitter 710. The electromagnetic interference shield plate 753 provides shielding to keep electromagnetic interference from leaking into or out of the optical block 720 and the module. The optical block 720 aligns a packaged optical receiver 711 with a lens 750 in the optical block 720. A light signal 201' received from an optical fiber propagates through an opening 730 in the nose receptacle 751, a fiber ferule 731, an optical port 759 in the electromagnetic interference shield plate 753, the lens 750 of the optical block 720 before reaching the light receiver 711. The device package of the light receiver 711 includes the photodetector pin 216C coupled to the photodetector therein as discussed previously.

The optical block 720 further aligns the light transmitter 710 with another lens in the optical block 720. The light transmitter 710 and light receiver 711 include optoelectronic devices for communicating with optical fibers using light of various wavelengths or photons. An optoelectronic device is a device which can convert or transduce light or photons into an electrical signal or an electrical signal into light or photons. In the case of transmitters, the light transmitters 710 are packaged emitters that can convert electrical signals into light or photons. Examples of emitters are semiconductor lasers (e.g. a VCSEL) or an LED which may be packaged in TO (transistor outline) cans. In the case of receivers, the light receivers 711 are packaged photodetectors, that detect or receive light or photons and convert it into an electrical signal. An example of a photo detector is a photo diode which may be packaged in a TO can. However other packages, housings or optoelectronic devices for receiving and transmitting light or photons may be used for the light transmitters 710 or light receivers 711.

The electromagnetic interference plate 753 has one or more projections 756 which engage one or more external notches 757 of the optical block 720 near its edges. The optical ports 759 of the electromagnetic interference plate 753 align with a pair of optical ports 729 and 730 of the nose receptacle 751. The electromagnetic interference plate 753 is electrically coupled to an outer housing 1000 (shown on FIG. 10A) via the projections 756 and shunts electromagnetic fields to the outer housing 1000. The fiber ferules 731 can be inserted into the optical ports 729 and 730 upon assembly. The nose receptacle 751 further has one or more posts 764 over which one or more holes 758 in the electromagnetic interference plate 753 can slide in order to align the nose receptacle 751, the pair of fiber ferules 731, the electromagnetic interference plate 753 and the optical block 720 together.

The nose receptacle 751 has a pair of LC receptacles 761 for mechanically coupling and aligning a pair of fiber optic cables (not shown) into the fiber optic module 700. Each LC receptacle 761 is a fiber optic receptacle for one serial fiber optic channel. The LC receptacles 761 in the nose receptacle 751 are preferably located without spacing between each other. Neighboring channels are separated far enough apart that a fiber optic module 700 having multiple channels can comply with FDA and IEC Class-1 eye safety limits. This eases handling of the fiber optic module 700 by avoiding the use of eye protection.

Due to the size of LC receptacles, TO-can size packages are usable which allows the output power level of each individual fiber optic channel to be separately monitored. Monitoring a fiber optic channel from a transmitter involves splitting the light beam so that a photodetector or photodiode packaged with the transmitter receives a portion of the light beam. The invention can monitor the fiber optic channel from a receiver. The direct coupling provided by embodiments of the invention avoid splitting the light beam to sample it for power monitoring and generating a reduced optical power level in the remaining portion of the light beam.

At the transmitter, the electrical output of the photodiode is measured to indicate the output optical power level of the fiber optic channel. At the receiver, the electrical output of the photodiode is measured to indicate the received optical power level from the fiber optic channel.

A relaxed spacing of the individual fiber optic receptacles can facilitate placing light beam splitters within the TO can of the light transmitter 710. In other cases, the spacing requirement may be tight and reduce the TO can size and type so that it is difficult to split and monitor the output power of the light transmitter. A light beam splitter within the transmitter splits the beam such that a portion of the light beam lands on a photodiode within the TO can. The photodiode's output is measured to monitor the output optical power of the transmitter. Thus, with each channel being separately monitored for power output, each channel can be individually optimized. Those skilled in the art will also recognize that other fiber optic connectors such as, but not limited to, SC, MT-RJ, VF45, and MU connectors, may be used in lieu of the LC receptacles 761.

Figure 8:
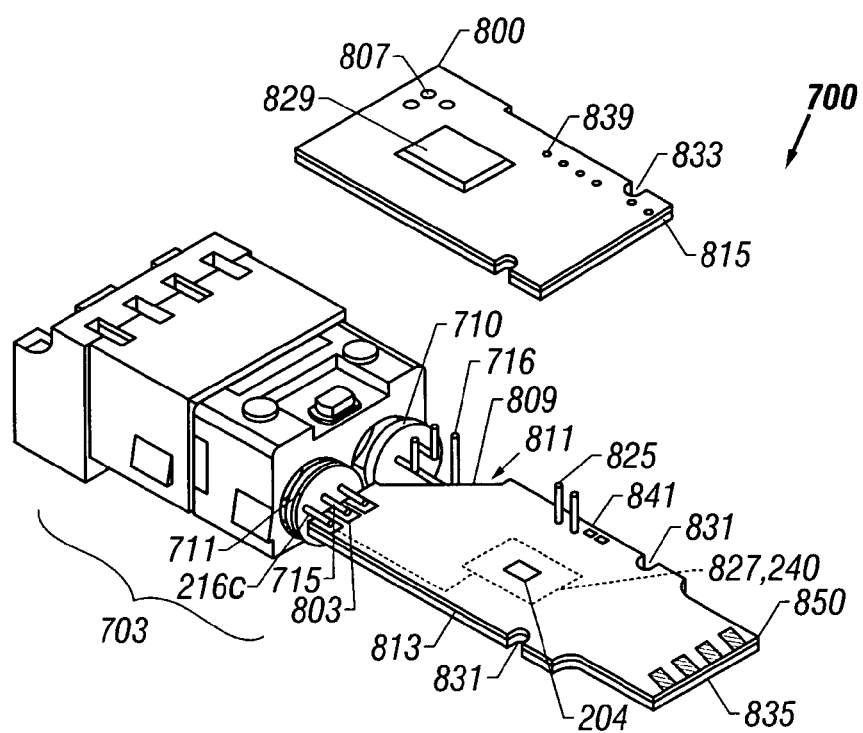
FIG. 8 is a partially assembled view of an optical element, receiver printed circuit board, and transmitter printed circuit board.

Referring now to FIG. 8, a partially assembled view of an optical element 703, a receiver printed circuit board 850, and a transmitter printed circuit board 800 for an embodiment of the invention is illustrated. Receiver printed circuit board 850 includes one or more receiver electrical components 827 (receiver integrated circuit (transimpedance amplifier and post amplifier), resistors, capacitors and other passive or active electrical components), a male electrical connector 835, and a receiver ground plane 813 (not shown). The one or more receiver electrical components 827 may include the average current measuring circuit 204 or the average power measuring circuit 204' coupled to the photodetector pin PD 216C and/or the monitoring circuit 240.

The transmitter printed circuit board 800 includes one or more transmitter electrical components 829 (transmitter integrated circuit (laser driver), resistors, capacitors and other passive or active electrical components) and a transmitter ground plane 815 (not shown). The receiver printed circuit board 850 and the transmitter printed circuit board 800 may be assembled by wave soldering.

At least one pin of the electrical connector 835 couples to an external electrical connector. The external electrical connectors may be SFP (Small Form Pluggable) SMT (Surface Mount Technology) connectors. One or more pins of the electrical connector 835 allow electrical signals, power, and ground to be coupled into or out of the fiber optic module 700.

Figure 9:
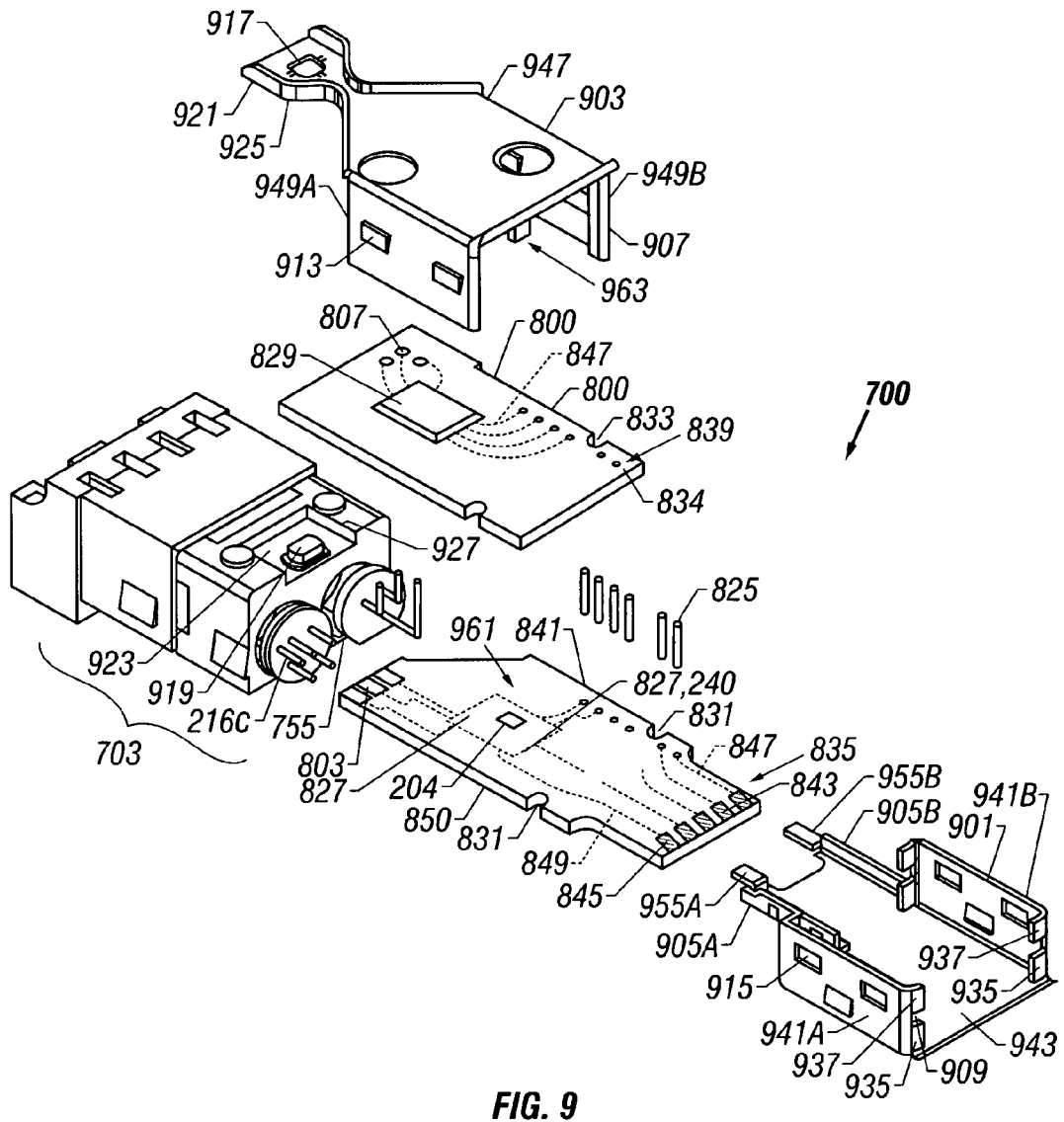
FIG. 9 is an exploded view of a printed circuit board cage subassembly and optical element.

Referring now to FIG. 9, an exploded view of the optical element 703, the receiver printed circuit board 850, the transmitter printed circuit board 800, a bottom frame 901, and a top frame 903 is illustrated. One or more transmitter pins 843 of the male electrical connector 835 which couple to the transmitter electrical components 829, the transmitter electrical components 829, the light transmitter 710, the interconnect leads 825 and a lens (not shown) of the optical block form one transmitting channel. The transmitter electrical components 829 control the light transmitter 710 and buffer the data signal received from a system for transmission over an optical fiber. One or more receiver pins 845 of the male electrical connector 835 which couple to the receiver electrical components 827, the receiver electrical components 827, the light receiver 711 and a lens (not shown) of the optical block form one receiving channel. The receiver electrical components 827 control the light receiver 711 and buffer the data signal received from an optical fiber. Other combinations of components can form other combinations of communications channels.

The optical element 703 includes the light receiver 711 with a plurality of straddle mount signal leads 715, one of which is the photodetector pin 216C. The Straddle mount signal leads 715 may be arranged to straddle a printed circuit board. The two rows of straddle mount signal leads 715 sandwich the receiver printed circuit board 850 so that the straddle mount signal leads 715 electrically couple the light receiver 711 to a plurality of receiver contacts 803 on both sides of the receiver printed circuit board 850. To improve the coupling between the straddle mount signal leads 715 and the receiver contacts 803, solder may be applied to the straddle mount signal leads 715 and the receiver contacts 803. The receiver contacts 803 are preferably a metal such as copper, silver, gold or other metal or alloy. The receiver contacts 803 may be on one or both the top and bottom surfaces of the receiver printed circuit board 850.

Optical element 703 has a light transmitter 710 with a plurality of formed (i.e. bent) signal leads 716. Each formed signal lead 716 is bent and turned up to couple to a header signal via 807, in the printed circuit board. The printed circuit board 850 has a cutout 809 that allows space for a horizontal portion of the formed signal lead 716. The cutout 809 may be at an angle cutting out a corner of receiver printed circuit board 850. In the alternative, the cutout 809 may be a square, semicircle, quarter circle or other shape. The vertical portion of each formed signal lead 716 is long enough to couple the light transmitter 710 to the transmitter printed circuit board 800.

The ends of formed signal leads 716 couple to a plurality of vias 807, through-holes, contacts or other coupling devices on the transmitter printed circuit board 800. To improve the coupling between a formed signal lead 716 and a via 807, solder may be applied to the formed signal lead 716 and the via 807. Since the printed circuit board assemblies and optical elements are mechanically coupled after the printed circuit boards have been wave soldered, the optical elements are not subject to the heat generated by wave soldering. While a 90 degree angle has been described, it is understood that other arrangements of the formed signal leads 716 may be employed to couple the light transmitter 710 to the transmitter printed circuit board 800.

When assembled into the fiber optic module, the receiver printed circuit board 850 and the transmitter printed circuit board 800 are vertically stacked and substantially parallel to each other. The top frame 903 and the bottom frame 901 hold the receiver printed circuit board 850 and the transmitter printed circuit board 800 in fixed vertical and horizontal alignment.

The fiber optic module further includes one or more interconnect leads 825 which electrically couple the transmitter electrical components 829 on the transmitter printed circuit board 800 to transmitter pins 843 of the electrical connector by means of signal traces in the receiver printed circuit board 850.

The receiver printed circuit board 850 includes a receiver ground plane 813 (shown in FIG. 8), and the transmitter printed circuit board 800 includes a transmitter ground plane 815 (shown in FIG. 8). Receiver ground plane 813 shunts electromagnetic fields radiating into it to ground via a pin in the male electrical connector 835. The transmitter ground plane 815 shunts electromagnetic fields radiating into ground through one or more of the interconnect leads 825, a transmitter trace 847 on the receiver printed circuit board 850, and a pin 843 in the male electrical connector 835.

The receiver printed circuit board 850 includes a pair of slots 831 (referred to as receiver slots 831) one in the left side edge and another in the right side edge of the printed circuit board as shown and illustrated in FIG. 8. The transmitter printed circuit board 800 includes a pair of slots 833 (referred to as transmitter slots 833) one in the left side edge and another in the right side edge of the printed circuit board as shown and illustrated in FIG. 8. The receiver slots 831 and the transmitter slots 833 facilitate alignment between the receiver printed circuit board 850 and the transmitter printed circuit board 800.

The bottom frame 901 includes a pair of sides 941A and 941B, a base 943, a pair of rails 905A and 905B, a plurality of lower support tabs 935 and a plurality of upper support tabs 937 extending from a pair of corners of each of the sides 941A and 941B as illustrated in FIG. 9. The base 943 of the bottom frame 901 is L shaped such that the rail 905B extends along the side and base of the bottom frame 901 while the rail 905B extends out of a center line (near the middle of the bottom frame) with a surface of the base there-between. The L shape leaves a cutout area from the base of the bottom frame which will be filled in by a bottom cover as described below. The rail 905A extending from the center line or middle of the bottom frame 901, includes a tip 955A that extends outward and is inserted into an opening 755 in the optical block 720.

The top frame 903 includes a top 947, a pair of top frame sides 949A and 949B, a pair of alignment rails 907, and a flange 921 as shown and illustrated in FIG. 9.

When assembled, the receiver printed circuit board 850 is inserted into a pair of slots 909 between the upper support tabs and the lower support tabs and rests on the lower support tabs 935 of the bottom frame 901. A pair of receiver slots 831 in edges of the receiver printed circuit board 850 are located near corners of the sides 941A and 941B of the receiver printed circuit board. The four lower support tabs 935 and the four upper support tabs 937 restrict vertical movement in the receiver printed circuit board 850 when its engaged thereto. One or more of the elements of the bottom frame 901 may be formed of a conductive material such as a metal or formed to include a conductive plating or surface. The conductive material of the bottom frame 901 shunts electro-magnetic fields to ground via an electrical coupling to chassis ground. In this manner the bottom frame 901 can provide electromagnetic interference shielding for the fiber optic module.

When assembled, the transmitter printed circuit board 800 rests on the four upper support tabs 937 of the bottom frame 901 such that the pair of transmitter slots 833 in the transmitter printed circuit board 800 are aligned directly above the pair of receiver slots 831 in the receiver printed circuit board 850 at a position adjacent to and above the upper support tabs 937. The alignment of the slots 833 with the slots 831 in each of the respective printed circuit boards assures that the transmitter interconnect vias 839 align with the receiver interconnect vias 841 such that the one or more interconnect leads 825 can be coupled there-between. The one or more interconnect leads 825 couple the respective transmitter traces 847 in the transmitter printed circuit board 800 and the receiver printed circuit board 850 together. The interconnect leads 825 are soldered to the receiver printed circuit board 850 at the receiver interconnect vias 841 on one end and to the transmitter printed circuit board 800 at the transmitter interconnect vias 839 at an opposite end. Though the interconnect leads 825 have been described as providing electrical coupling between the receiver printed circuit board 850 and the transmitter printed circuit board 800, it is understood that other interconnect devices may be employed including ribbon cable, wires, male and female electrical connectors and the like.

The pair of top frame sides 949A and 949B of the top frame 903 engage with the bottom frame sides 941A and 941B of the bottom frame 901 respectively when they are assembled together. When assembled, external faces of the top frame sides 949 abut inside faces of bottom frame sides 941. Each of the top frame sides have a pair of locking tabs 913 which engage with a pair of lock tab apertures 915 in each of the bottom frame sides 941 to hold them together. The locking tabs 913 and the locking tab apertures 915 prevent the bottom frame 901 and the top frame 903 from moving vertically relative to each other. Each vertical edge of the top frame sides 949A and 949B mates with the upper tabs 937 and the lower tabs 935 to keep the top frame 903 from moving laterally relative to the bottom frame 901. The top frame 903 has the pair of alignment rails 907 on edges of the top frame sides 949A and 949B. The alignment rails 907 mate with the pair of transmitter slots 833 in the transmitter printed circuit board 800 and the pair of the receiver slots 831 in the receiver printed circuit board 850 to keep them in alignment so that the interconnect leads 825 are not sheared by movement in either and the electrical coupling is maintained. Top frame 903 has a tab 963, rib, post or other member on the underside of top 947. When top frame 903 is assembled to the bottom frame 901 and transmitter board 800, the tab 963 prevents upward movement of transmitter printed circuit board 800. Additionally, the pair of alignment rails 907 abut a pair of lower support tabs 935 and a pair of upper support tabs 937 to maintain alignment and avoid movement as stress is placed on the receiver printed circuit board 850 when the fiber optic module is pulled away from a connector. The top frame 903 includes the flange 921 which extends from the top 947 of the top frame 903 as shown and illustrated in FIG. 9. The flange 921 includes an opening 917 which slides over a top post 919 of the optical block 720 of the optical element 703. When the opening 917 of the flange 921 is mated with the top post 919, the top frame 903 is tightly coupled to the optical element 703 to avoid separation when the fiber optic module is inserted or removed from a connector. With the opening 917 engaged to the top post 919 so that the top frame is tightly coupled, the alignment rails 907 of the top frame 903 in conjunction with the receiver slots 831 and the transmitter slots 833, keep the receiver printed circuit board 850 and the transmitter printed circuit board 800 tightly coupled to the optical element 703 as well to avoid separation. The flange 921 includes a flange lip 925 that abuts a recess wall 927 of the optical block 720 to prevent lateral movement of the top frame 903 relative to the optical elements 703.

The top frame 903 includes a pair of top frame sides 949A and 949B and the top 947. These and other elements of the top frame may be formed of a conductive material such as a metal or formed to include a conductive plating or surface. The conductive material of the top frame 903 shunts electromagnetic fields to ground via an electrical coupling to chassis ground. In this manner, the top frame 903 provides electromagnetic interference shielding to the fiber optic module.

The assembled subassembly including the receiver printed circuit board 850, the transmitter printed circuit board 800, the interconnect leads 825, the bottom frame 901 and the top frame 903 can hereinafter be referred to as a printed circuit board assembly 1011.

Figure 10A:
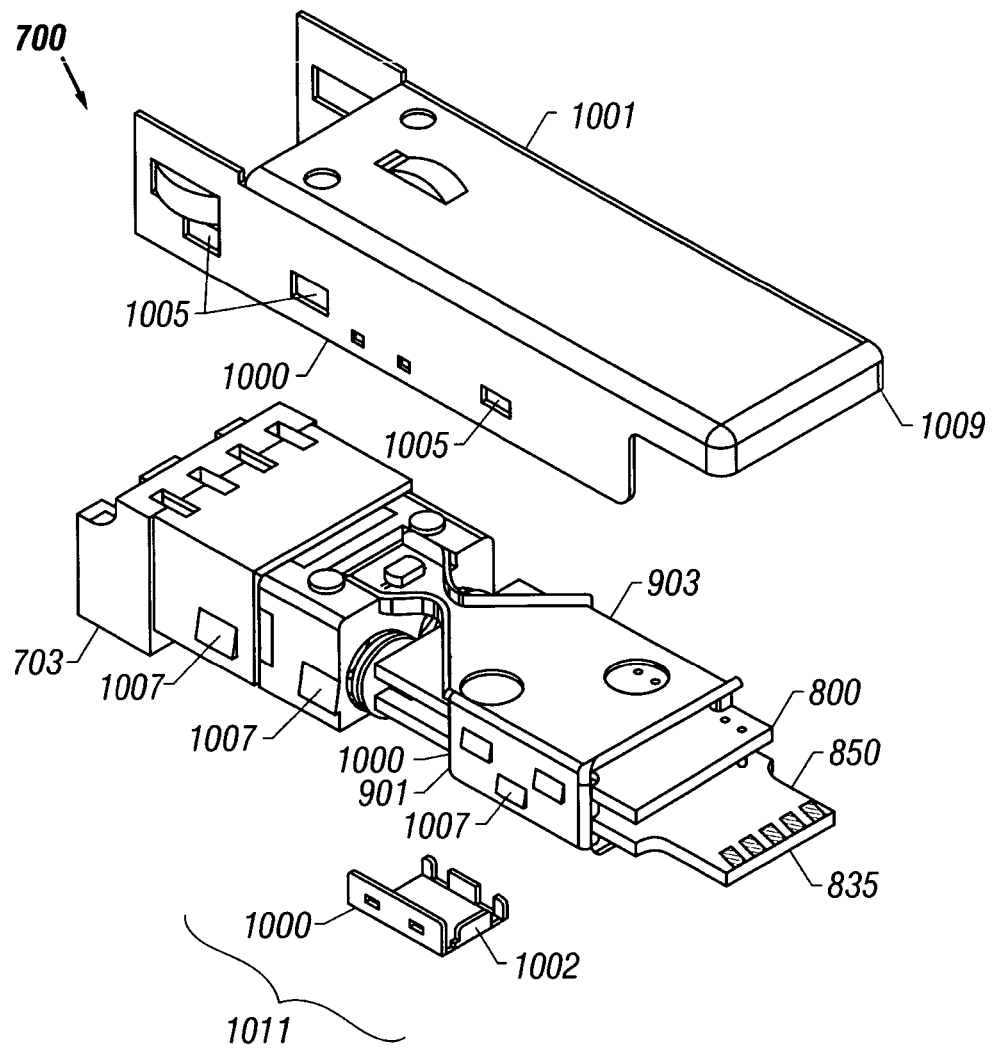
FIG. 10A is an exploded view from the rear of an embodiment of a hot pluggable fiber optic module.

Referring now to FIG. 10A, an exploded view of an outer housing 1000 and the printed circuit board assembly 1011 is illustrated. The outer housing 1000 includes a top cover 1001, a bottom cover 1002 and the L shaped bottom frame 901. The top cover 1001, the bottom cover 1002 and the bottom frame 901 couple together and around the optical block 720 to encase the receiver and transmitter printed circuit boards but for one end where the extension in the receiver printed circuit board forms the male connector 835. The top cover 1001 includes a top portion and a pair of sides that fit over the printed circuit board assembly 1011 and the optical element 703. The top cover 1001 includes a plurality of locating tab openings 1005 in each of its sides to engage with locating tabs 1007 in sides of the optical block 720, in the nose of optical element 703, and in the bottom frame 901. When the locating tab openings 1005 are engaged with the locating tabs 1007, movement of the top cover 1001 relative to the optical element 703 is prohibited. The top cover 1001 includes a hood 1009 which encloses an end of the transmitter printed circuit board 800 but leaves the connector 835 of the receiver printed circuit board 850 exposed to connect to a connector. The male electrical connector 835 extends from the top cover 1001 to mechanically and electrically couple to an external female electrical connector.

The bottom cover 1002 is of sufficient size to fill into the cutaway area in the L shaped bottom frame 901. The bottom cover 1002 couples to the bottom frame 901 on one side and the top cover 1001 on an opposite side.

Figure 10B:
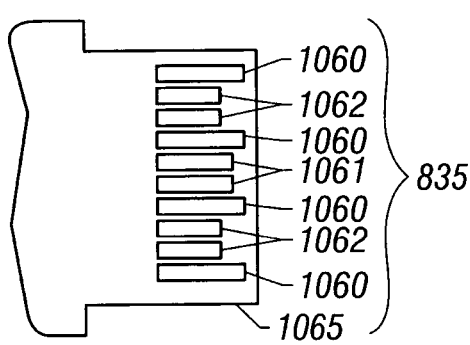
FIG. 10B is a magnified view of a side of a male electrical connector to provide hot pluggability.
Figure 10C:
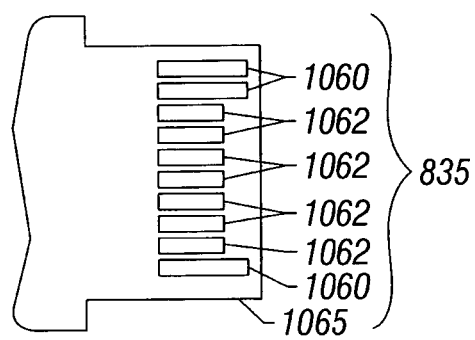
FIG. 10C is a magnified view of another side of the male electrical connector to provide hot pluggability.

Referring now to FIGS. 10B and 10C, pins of the male electrical connector 835 are illustrated in detail to provide hot pluggability. The male electrical connector 835 includes one or more ground or negative power pins 1060, one or more positive power pins 1061 and one or more signal pins 1062 on top and/or bottom surfaces of the receiver printed circuit board 850. The pins 1060, 1061, and 1062 are staggered from each other with reference to an edge 1065 of the receiver printed circuit board 850 to facilitate the hot pluggability. The ground pins 1060 of the male electrical connector 835 are closer to the edge 1065 than any other pin in the male electrical connector 835 in order for ground to be established first when the fiber optic module is inserted and for ground to be removed last when its removed. The positive power pins 1061 are next closest to the edge 1065 for power to be established secondly when the fiber optic module is inserted and for power to be removed next to last when its removed. The signal pins 1062 are farther from the edge that the power pins 1061 and ground pins 1062 so that they are established after power and ground has been when inserted and they are disconnect first when the fiber optic module is removed.

During the mating of the male electrical connector 835 with an external female electrical connector, the ground pins electrically couple first to ground receptacles of the external female electrical connector in order to ground the fiber optic module 700. During the demating of the male electrical connector 835 and external female electrical connector, the ground pin electrically decouples from the ground last to maintain the grounding of the fiber optic module 700 until after power is removed from the fiber optic module 700. The ground pins 1060 being closer to the edge 1065 than the power pins 1061 and the signal pins 1062, prevents damage and disruption to the fiber optic module and the system during the physical insertion and removal of the fiber optic module into and out of the system. The capability to physically remove and insert the fiber optic module during operation without damage or disruption is referred to as hot pluggability.

The outer housing 1000, including the top cover 1001 and the bottom cover 1002 and the bottom frame 901, may be formed of a conductive material such as a metal or include a conductive plating or surface. With the outer housing 1000 formed out of a conductive material, the outer housing 1000 can shunt electro-magnetic fields radiating into the outer housing 1000 to ground via an electrical coupling to chassis ground. In this manner the outer housing 1000 also can provide electromagnetic interference shielding to the fiber optic module.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An optical system to receive a modulated light signal, the optical system comprising:
a photodetector to receive at least a portion of the modulated light signal and generate an electrical signal in response thereto, the electrical signal including a data signal utilized to generate the modulated light signal;
an amplifier coupled to the photodetector to receive the electrical signal, the amplifier to detect the data signal in the electrical signal; and
an optical power measuring circuit coupled to the photodetector to receive the electrical signal, responsive to the electrical signal the optical power measuring circuit to detect an average optical power level for the modulated light signal.

2. The optical system of claim 1, wherein the optical power measuring circuit has an input directly coupled to a terminal of the photodetector to receive the electrical signal.

3. The optical system of claim 1, wherein the amplifier has an input directly coupled to a terminal of the photodetector to receive the electrical signal.

4. The optical system of claim 1, wherein the electrical signal is a current signal.

5. The optical system of claim 1, wherein the electrical signal is a voltage signal.

6. The optical system of claim 1, wherein the photodetector receives a portion of the modulated light signal due to optical inefficiencies.

7. The optical system of claim 1, wherein the photodetector is a semiconductor photodiode.

8. The optical system of claim 1, wherein the modulated light signals are received from an optical waveguide.

9. The optical system of claim 8, wherein the optical waveguide is an optical fiber.

10. The optical system of claim 1, wherein the modulated light signals are received from free space.

11. An optical system to measure average received optical power in received light signals, the optical system comprising;
    an optical receiver including
        a device package with a header, a first pin extending into the device package through the header, and
        a photodetector supported by the device package to receive the received light signals, the photodetector having a first terminal and a second terminal, the first terminal of the photodetector coupled to the first pin of the device package, the photodetector to generate an electrical signal on the first pin in response to the received light signals; and
    an averaging circuit coupled to the first pin of the device package of the optical receiver, the averaging circuit to monitor the electrical signal on the first pin to determine the average received optical power in the received light signals.

12. The optical system of claim 11, wherein the device package is a TO type package, and wherein the device package has a windowed TO can coupled to the header, the windowed TO can including a window to allow passage of the received light signals into the device package.

13. The optical system of claim 11, wherein the optical receiver further includes a capacitor having a first terminal coupled to the header of the package and a second terminal coupled to the first pin, the capacitor to filter noise from the first pin.

14. The optical system of claim 13, wherein the optical receiver further includes an amplifier having an input coupled to the second terminal of the semiconductor photodetector and an output coupled to a data pin, the amplifier to amplify the photocurrent of the semiconductor photodetector and detect data signals therein to generate a data output signal on the data pin.

15. The optical system of claim 11, wherein the averaging circuit is a part of a monitoring circuit for a fiber optic module, optical transceiver, or optical data link.

16. The optical system of claim 11, wherein the received light signals are received from an optical waveguide and coupled into the device package.

17. The optical system of claim 16, wherein the optical waveguide is an optical fiber.

18. The optical system of claim 11, wherein the received light signals are received from free space and coupled into the device package.

19. The optical system of claim 11, wherein the device package has a windowed cover coupled to the header, the windowed cover including a window to allow passage of the received light signals into the device package.

20. The optical system of claim 19, wherein the window is a lens to focus light into the photodetector.

21. The optical system of claim 19, wherein the window is transmissive to desired wavelengths of the received light signals.

22. The optical system of claim 21, wherein the window is opaque to undesired wavelengths of the received light signals.

23. A method of measuring average received optical power, the method comprising:
    receiving light signals;
    transducing the light signals into electrical signals;
    coupling the electrical signals into an averaging circuit to determine the average received optical power; and
    amplifying the electrical signals into amplified electrical signals to extract data signals.

24. The method of claim 23, wherein the receiving, the transducing, and the amplifying are performed in a packaged optical receiver and the averaging circuit is external to the packaged optical receiver.

25. The method of claim 23, further comprising: extracting data signals from the amplified electrical signals to determine the information contained therein.

26. The method of claim 25, wherein the receiving, the transducing, the amplifying, and the extracting are performed in a packaged optical receiver and the averaging circuit is external to the packaged optical receiver.

27. The method of claim 26, wherein
    the receiving of light signals is performed by a device package of the packaged optical receiver,
    the transducing of the light signals into the electrical signals is performed by a photodetector,
    the coupling of the electrical signals into the averaging circuit to determine the average received optical power is performed by electrically connecting a terminal of the photodetector within the device package to the averaging circuit outside of the device package, and
    the extracting of data signals is performed by a preamplifier mounted within the packaged optical receiver electrically coupled to the photodetector.

28. An optical system comprising;
    a printed circuit board including an averaging circuit and a connection for connecting to a host system;
    a packaged optical receiver coupled to the printed circuit board, the packaged optical receiver including a photodetector and an amplifier mounted therein, the photodetector to receive and convert optical signals into electrical signals, the amplifier to amplify the electrical signals and detect data signals therein, the packaged optical receiver directly coupling the electrical signals of the photodetector to the averaging circuit; and
    a fiber optic plug receptacle to align the optical signals into the packaged optical receiver;
    wherein the averaging circuit is for receiving the electrical signals from the photodetector and generating an output representing the average received optical power of the packaged optical receiver.

29. The optical system of claim 28, wherein the averaging circuit is a part of a monitoring circuit of the printed circuit board for the optical system to monitor the operational status thereof.

30. The optical system of claim 28, further comprising a housing to house the printed circuit board, the packaged optical receiver and the fiber optic plug receptacle together as a unit.

31. An optical system to receive light signals, the optical system comprising:
    a TO device package including
        a TO header,
        at least five pins, four of the at least five pins extending into the device package and one pin of the at least five pins being a ground pin coupled to the TO header, and
        a windowed TO can coupled to the header, the windowed TO can including an opening and a window coupled over the opening, the opening and the window to allow passage of the light signals into the TO device package; and a photodetector supported by the TO header, the photodetector having a first terminal and a second terminal, the first terminal of the photodetector coupled to one of the four pins extending through the header of the TO device package, the photodetector to generate an electrical signal on the pin coupled to the first terminal in response to the light signals in order to measure the received optical power.

32. The optical system of claim 31, further comprising; a preamplifier supported by the TO header, the preamplifier having an input coupled to the second terminal of the photodetector, the preamplifier to amplify the electrical signal and detect a data signal therein.

33. The optical system of claim 32, further comprising: a first capacitor having a bottom terminal coupled to the To header and a top terminal coupled to the first terminal of the photodetector, the first capacitor to filter noise on the first terminal.

34. The optical system of claim 33, further comprising: a second capacitor having a bottom terminal coupled to the TO header and a top terminal coupled to a positive power supply pin of the four pins extending through the header, the second capacitor to stabilize a level of a positive power supply provided on the positive power supply pin and filter noise therefrom.

35. The optical system of claim 33, further comprising; a sense resistor having a first terminal coupled to a positive power supply pin of the four pins extending through the header and a second terminal coupled to the first terminal of the photodetector, the sense resistor to further generate the electrical signal to measure the received optical power level.

36. The optical system of claim 35, wherein the electrical signal is a voltage signal between the positive power supply pin and the first terminal of the photodetector.

37. The optical system of claim 31, wherein the electrical signal is a current signal on the pin coupled to the first terminal of the photodetector.

38. The optical system of claim 31, wherein the light signals are received from free space and coupled into the TO device package through the window.

39. The optical system of claim 31, wherein the light signals are received from an optical waveguide and coupled into the TO device package through the window.

40. The optical system of claim 39, wherein the optical waveguide is an optical fiber.

* * * * *